United States Patent
Bradford et al.

(10) Patent No.: US 9,062,213 B2
(45) Date of Patent: Jun. 23, 2015

(54) NON-AQUEOUS EMULSIONS AND METHODS OF PREPARING SURFACE-TREATED ARTICLES

(71) Applicant: Dow Corning Corporation, Midland, MI (US)

(72) Inventors: Michael L. Bradford, Midland, MI (US); Fengqiu Fan, Midland, MI (US); Donald T. Liles, Midland, MI (US); Ryan F. Schneider, Midland, MI (US); William J. Schulz, Midland, MI (US)

(73) Assignee: DOW CORNING CORPORATION, Midland, MI (US)

( * ) Notice: Subject to any disclaimer, the term of this patent is extended or adjusted under 35 U.S.C. 154(b) by 0 days.

(21) Appl. No.: 14/159,101

(22) Filed: Jan. 20, 2014

(65) Prior Publication Data

US 2014/0272111 A1    Sep. 18, 2014

Related U.S. Application Data

(60) Provisional application No. 61/777,020, filed on Mar. 12, 2013.

(51) Int. Cl.
| | |
|---|---|
| *C09D 5/02* | (2006.01) |
| *C03C 17/30* | (2006.01) |
| *C08G 65/00* | (2006.01) |
| *C09D 171/00* | (2006.01) |
| *C08G 65/336* | (2006.01) |
| *C08J 3/09* | (2006.01) |

(52) U.S. Cl.
CPC ............... *C09D 5/024* (2013.01); *C08J 3/093* (2013.01); *C08J 3/095* (2013.01); *C08J 3/092* (2013.01); *C03C 17/30* (2013.01); *C08G 65/007* (2013.01); *C09D 171/00* (2013.01); *C08G 65/336* (2013.01)

(58) Field of Classification Search
CPC ............ C08J 3/093; C08J 3/095; C08J 3/092; C09D 5/024; C09D 171/00; C09D 183/00
See application file for complete search history.

(56) References Cited

U.S. PATENT DOCUMENTS

| | | |
|---|---|---|
| 5,739,369 A | 4/1998 | Matsumura et al. |
| 6,183,872 B1 | 2/2001 | Tanaka et al. |
| 6,592,659 B1 | 7/2003 | Terrazas et al. |
| RE39,045 E | 3/2006 | Ogawa et al. |
| 7,097,910 B2 | 8/2006 | Moore et al. |
| 7,176,401 B2 | 2/2007 | Sakoda |
| 7,229,503 B2 | 6/2007 | De Dominicis et al. |
| 2001/0025095 A1* | 9/2001 | Dominicis et al. ............... 528/10 |
| 2009/0208728 A1 | 8/2009 | Itami et al. |
| 2013/0101743 A1* | 4/2013 | Wu et al. ............. 427/385.5 |

FOREIGN PATENT DOCUMENTS

| | | |
|---|---|---|
| JP | 09-263728 | 10/1997 |
| JP | 2011-213895 A | 10/2011 |
| JP | 2011-225710 A | 11/2011 |
| JP | 2012-097267 A | 5/2012 |
| WO | WO 2013/106383 A1 | 7/2013 |

OTHER PUBLICATIONS

English language abstract and translation for JP 2011-213895 extracted from PAJ database on Dec. 23, 2013, 31 pages.
English language abstract and translation for JP 2011-225710 extracted from PAJ database on Dec. 23, 2013, 21 pages.
English language abstract and translation for JP 2012-097267 extracted from PAJ database on Dec. 23, 2013, 86 pages.

* cited by examiner

*Primary Examiner* — Margaret Moore
(74) *Attorney, Agent, or Firm* — Dow Corning Corporation

(57) ABSTRACT

Non-aqueous emulsions comprise a continuous organic phase comprising an organic vehicle. The non-aqueous emulsions further comprise a discontinuous phase comprising a polyfluoropolyether silane. Methods of preparing surface treated articles therewith are also disclosed.

17 Claims, No Drawings

NON-AQUEOUS EMULSIONS AND METHODS OF PREPARING SURFACE-TREATED ARTICLES

FIELD OF THE INVENTION

The present invention generally relates to non-aqueous emulsions and, more specifically, to non-aqueous emulsions for surface treatment and methods of preparing surface treated articles with the non-aqueous emulsions.

DESCRIPTION OF THE RELATED ART

Surfaces of electronic and optical devices/components are susceptible to staining and smudging, oftentimes due to oils from hands and fingers. For example, electronic devices including an interactive touch-screen display, e.g. smart phones, are generally smudged with fingerprints, skin oil, sweat, cosmetics, etc., when used. Once these stains and/or smudges adhere to the surfaces of these devices, the stains and/or smudges are not easily removed. Moreover, such stains and/or smudges decrease the usability of these devices.

In an attempt to minimize the appearance and prevalence of such stains and smudges, conventional surface treatment compositions have been applied on the surfaces of various devices/components to form conventional layers thereon. Such conventional surface treatment compositions typically consist of a fluorinated polymer and a solvent. However, the solvents utilized in such conventional surface treatment compositions are limited to halogenated (e.g. fluorinated) solvents to properly solubilize the fluorinated polymer, and such halogenated solvents are comparatively expensive. Moreover, these halogenated solvents may have undesirable environmental profiles. Alternative solvents, such as organic solvents, are generally incapable of solubilizing fluorinated polymers. When the fluorinated polymers are not properly dispersed or homogeneous within conventional surface treatment compositions, resulting physical properties of the conventional layers formed therefrom suffer.

SUMMARY OF THE INVENTION AND ADVANTAGES

The present invention provides non-aqueous emulsions. The non-aqueous emulsions comprise a continuous organic phase comprising an organic vehicle. The non-aqueous emulsions further comprise a discontinuous phase comprising a polyfluoropolyether silane. In a first embodiment, the non-aqueous emulsion exhibits the Tyndall effect for a period of time. In a second embodiment, the organic vehicle is selected from the group consisting of t-butyl acetate, acetone, tetrahydrofuran, n-butyl acetate, dimethyl sulfoxide, methylene chloride, diglyme, tetraethylene glycol dimethyl ether, triethylene glycol dimethyl ether, methyl 10-undecenoate, dimethylformamide, t-butyl acetoacetate, methyl isobutyl ketone, 2-pentanone, 2-butanone, acetylacetone, limonene, xylene, propylene carbonate, isopropanol, 1-methoxy-2-propanol, propylene glycol monomethyl ether acetate, isoamyl acetate, diethyl fumarate, t-butanol, 1-butanol, t-butyl methyl ether, toluene, ethylene glycol, and combinations thereof.

The present invention additionally provides methods of preparing a surface-treated article. In a first method, the non-aqueous emulsion is applied to a surface of an article to form a wet layer thereof on the surface of the article. The first method further comprises removing the organic vehicle from the wet layer to form a layer on the surface of the article and give the surface-treated article. In a second method, the non-aqueous emulsion and a pellet are combined to form an impregnated pellet. The second method further comprises the step of removing the organic vehicle from the impregnated pellet to form a neat pellet. The second method also comprises the step of forming a layer on a surface of an article with the neat pellet via a deposition apparatus.

The non-aqueous emulsions form layers that are easy to clean and which have excellent physical properties, including stain and smudge resistance. Further, the layers formed from the non-aqueous emulsions may be formed at a fraction of the cost of conventional surface treatment compositions while still providing excellent and desirable physical properties.

DETAILED DESCRIPTION OF THE INVENTION

The present invention provides non-aqueous emulsions and methods of preparing surface-treated articles with the non-aqueous emulsions. The non-aqueous emulsions form layers that are easy to clean and which have excellent physical properties, including smudge and stain resistance. Further, the layers formed from the non-aqueous emulsions have a significantly reduced cost and more favorable toxicological and environmental profiles as compared to conventional layers formed from conventional compositions including fluorinated polymers and halogenated solvents.

Various embodiments of the non-aqueous emulsions are described herein. To that end, unless otherwise indicated below, the following description is applicable to these various embodiments of the non-aqueous emulsions. For purposes of clarity, although different embodiments of the non-aqueous emulsions are described below, the non-aqueous emulsions may be referred to in singular form herein as the non-aqueous emulsion without being limited to one particular embodiment unless otherwise indicated.

The non-aqueous emulsion comprises a continuous organic phase comprising an organic vehicle and a discontinuous phase comprising a polyfluoropolyether silane. By "non-aqueous," it is meant that water does not constitute either the continuous or the discontinuous phase of the non-aqueous emulsion. Further, the non-aqueous emulsion is typically substantially free from water, which may undesirably cause hydrolysis of certain components in the non-aqueous emulsion. "Substantially free," as used herein with reference to the non-aqueous emulsion being substantially free from water, means that the non-aqueous emulsion may comprise water in an amount of from 0 to less than 2, alternatively from 0 to less than 1, alternatively from 0 to less than 0.5, alternatively from 0 to less than 0.1, alternatively from 0 to less than 0.05, alternatively 0, parts by weight based on 100 parts by weight of the non-aqueous emulsion.

The polyfluoropolyether silane of the discontinuous phase of the non-aqueous emulsion may be any known perfluoropolyether silane, which are often utilized in conventional surface treatment compositions. The polyfluoropolyether silane may be monomeric, oligomeric, or polymeric. Alternatively, the polyfluoropolyether silane may comprise various combinations of different monomeric, oligomeric, and/or polymeric polyfluoropolyether silanes.

In various embodiments, the polyfluoropolyether silane has the following general formula (A):

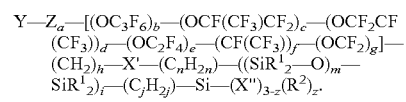

While the polyfluoropolyether silane of the non-aqueous emulsion is not limited to that of general formula (A), specific aspects of general formula (A) are described in greater detail below. The groups indicated by subscripts b-g, i.e., the groups within the square brackets in formula (A), may be present in any order within the polyfluoropolyether silane, including a different order as that which is represented in general formula (A) above and throughout this disclosure. Moreover, these groups may be present in randomized or block form. In addition, the group represented by subscript b is typically linear, i.e., the group represented by subscript b may alternatively be written as $(O-CF_2-CF_2-CF_2)_b$. In the description below, $C_{p'}-C_{q'}$ (with p' and q' each being integers) regarding a hydrocarbon or alkyl group means such group has from p' to q' carbon atoms. When the group indicated by subscript i is present, the polyfluoropolyether silane comprises a siloxane segment. Even in these embodiments, the polyfluoropolyether silane is generally referred to as a silane in view of the terminal silicon atom that is not present in any siloxane segment.

In general formula (A) above, Z is independently selected from $-(CF_2)-$, $-(CF(CF_3)CF_2O)-$, $-(CF_2CF(CF_3)O)-$, $-(CF(CF_3)O)-$, $-(CF(CF_3)-CF_2)-$, $-(CF_2-CF(CF_3))-$, and $-(CF(CF_3))-$. Z is typically selected such that the polyfluoropolyether silane does not include an oxygen-oxygen (O—O) bond within the backbone. In addition, in this general formula, a is an integer from 1 to 200; b, c, d, e, f, and g are integers each independently selected from 0 or from 1 to 200; h, n and j are integers each independently selected from 0 or from 1 to 20; i and m are integers each independently selected from 0 or from 1 to 5; X' is a divalent organic group or an oxygen atom; $R^1$ is an independently selected $C_1$-$C_{22}$ hydrocarbyl group; z is an integer independently selected from 0 to 2; X" is an independently selected hydrolysable group; $R^2$ is an independently selected $C_1$-$C_{22}$ hydrocarbyl group which is free of aliphatic unsaturation; and Y is selected from H, F, and $(R^2)_z(X")_{3-z}Si-(C_jH_{2j})-((SiR^1_2-O)_m-SiR^1_2)_i-(C_nH_{2n})-X'-(CH_2)_h-$; wherein X", X', z, $R^1$, $R^2$, j, m, i, n, and h are as defined above.

$R^1$, which is an independently selected $C_1$-$C_{22}$ hydrocarbyl group, may be linear, branched, or cyclic. In addition, $R^1$ may include heteroatoms within the hydrocarbyl group, such as oxygen, nitrogen, sulfur, etc., and may be substituted or unsubstituted. Typically, $R^1$ is $C_1$-$C_4$ alkyl group. In addition, the groups indicated by subscripts n and j, i.e., groups $(C_nH_{2n})$ and $(C_jH_{2j})$, may also be independently linear or branched. For example, when n is 3, these groups may independently have the structure $-CH_2-CH_2-CH_2-$, $-CH(CH_3)-CH_2-$, or $-CH_2-CH(CH_3)-$, wherein the latter two structures have pendent alkyl groups, i.e., these structures are branched and not linear.

With respect to the moieties represented by subscripts m, i, and j: when subscript i is 0, subscript j is also 0; when subscript i is an integer greater than 0, subscript j is also an integer greater than 0; and when subscript i is an integer greater than 0, m is also an integer greater than 0. Said differently, when the group represented by subscript i is present, the group represented by subscript j is also present. The inverse is also true, i.e., when the group represented by subscript i is not present, the group represented by subscript j is also not present. In addition, when i is an integer greater than 0, the group represented by subscript m is present, and m is also an integer greater than 0. In certain embodiments, subscripts m and i are each 1. Typically, the subscript i does not exceed 1, although the subscript m may be an integer greater than 1 such that siloxane bonds (i.e., Si—O bonds) are present within the group represented by subscript i.

In certain embodiments, the polyfluoropolyether silane of the non-aqueous emulsion is subject to the proviso that when Y is F; Z is $-(CF_2)-$; a is an integer from 1 to 3; and subscripts c, d, f, i, m, and j are each 0.

The hydrolysable group represented by X" in general formula (A) is independently selected from H, a halide group, an alkoxy ($-OR^3$) group, an alkylamino ($-NHR^3$ or $-NR^3R^4$) group, a carboxy ($-OOC-R^3$) group, an alkyliminoxy ($-O-N=CR^3R^4$) group, an alkenyloxy ($O-C(=CR^3R^4)R^5$) group, or an N-alkylamido ($-NR^3COR^4$) group, wherein $R^3$, $R^4$ and $R^5$ are each independently selected from H and a $C_1$-$C_{22}$ hydrocarbyl group. When $R^3$, $R^4$ and $R^5$ are independently $C_1$-$C_{22}$ hydrocarbyl groups, $R^3$, $R^4$ and $R^5$ may be linear, branched, or cyclic (for $C_3$-$C_{22}$ hydrocarbyl groups). In addition, $R^3$, $R^4$ and $R^5$ may independently include one or more heteroatoms, such as N, O, and/or S, within the hydrocarbyl group, and may be substituted or unsubstituted. Typically, $R^3$, $R^4$ and $R^5$ are each independently selected $C_1$-$C_4$ alkyl groups. In certain embodiments, the hydrolysable group represented by X" in general formula (A) is independently selected from an alkoxy ($-OR^3$) group and an alkylamino ($-NHR^3$ or $-NR^3R^4$) group. When the hydrolysable group represented by X" in general formula (A) is the $NR^3R^4$ group, $R^3$ and $R^4$ optionally can be taken together with the N atom to which they are bonded to form a cyclic amino group.

Non-limiting, exemplary embodiments of particular species of the polyfluoropolyether silane of the non-aqueous emulsion are described in detail below. Typically in these embodiments, z is 0 such that polyfluoropolyether silane includes three hydrolysable groups represented by X". However, as described above, z can be an integer other than 0 (e.g. 1 or 2) such that these particular polyfluoropolyether silanes include fewer than three hydrolysable groups.

In certain embodiments, Y in general formula (A) is F. Typically, when Y in general formula (A) is F, subscripts c, d, and g in general formula (A) are each 0. As such, in these embodiments, when the groups indicated by subscripts c, d, and g are absent, the polyfluoropolyether silane has the general formula $F-Z_a-[(OC_3F_6)_b-(OC_2F_4)_e-(CF(CF_3))_f]-(CH_2)_h-X'-(C_nH_{2n})-((SiR^1_2-O)_m-SiR^1_2)_i-(C_jH_{2j})-Si-(X")_{3-z}(R^2)_z$.

In one embodiment of the non-aqueous emulsion in which Y in general formula (A) is F, as introduced above, Z in general formula (A) is $-(CF_2)-$, subscripts c, d, f, and g in general formula (A) are 0 and subscripts b, e, h, and n in general formula (A) are each independently an integer greater than 0. As but one example of this embodiment, subscript a is 3, subscript b is at least 1, subscript e is 1, subscript h is 1, X' is an oxygen atom, subscript n is 3, and subscripts m, i, and j are each 0. In this one example, the polyfluoropolyether silane has the following general formula: $CF_3-CF_2-CF_2-(O-CF_2-CF_2-CF_2)_b-O-CF_2-CF_2-CH_2-O-CH_2-CH_2-CH_2-Si-(X")_{3-z}(R^2)_z$. Thus, when the hydrolysable groups represented by X" are all alkoxy groups, e.g. methoxy groups, this particular polyfluoropolyether silane has the following general formula: $CF_3-CF_2-CF_2-(O-CF_2-CF_2-CF_2)_b-O-CF_2-CF_2-CH_2-O-CH_2-CH_2-CH_2-Si-(OCH_3)_3$. Alternatively, when the hydrolysable groups represented by X" are all alkylamino groups, e.g. $N(CH_3)_2$ groups, this particular polyfluoropolyether silane has the following general formula: $CF_3-CF_2-CF_2-(O-CF_2-CF_2-CF_2)_b-O-CF_2-CF_2-CH_2-O-CH_2-CH_2-CH_2-Si-(N(CH_3)_2)_3$. In these embodiments, subscript b is typically an integer from 17 to 25.

In another embodiment of the non-aqueous emulsion in which Y in general formula (A) is F and Z in general formula (A) is $-(CF_2)-$, as described above, subscripts c, d, f, and g in general formula (A) are 0 and subscripts b, e, h, n, m, i, and j in general formula (A) are each independently an integer greater than 0. As but one example of this embodiment, subscript a is 3, subscript b is at least 1, subscript e is 1, subscript h is 1, X' is an oxygen atom, subscript n is 3, subscript m and i are each 1, and subscript j is 2. In this one example, the polyfluoropolyether silane has the following general formula: $CF_3$—$CF_2$—$CF_2$—(O—$CF_2$—$CF_2$—$CF_2$)$_b$—O—$CF_2$—$CF_2$—$CH_2$—O—$CH_2$—$CH_2$—$CH_2$—$Si(CH_3)_2$—O—$Si(CH_3)_2$—$CH_2$—$CH_2$—$Si$—$(X'')_{3-z}(R^2)_z$. Thus, when the hydrolysable groups represented by X'' are all alkoxy groups, e.g. methoxy groups, and z is 0, this particular polyfluoropolyether silane has the following general formula: $CF_3$—$CF_2$—$CF_2$—(O—$CF_2$—$CF_2$—$CF_2$)$_b$—O—$CF_2$—$CF_2$—$CH_2$—O—$CH_2$—$CH_2$—$CH_2$—$Si(CH_3)_2$—O—$Si(CH_3)_2$—$CH_2$—$CH_2$—$Si(OCH_3)_3$. In these embodiments, subscript b is typically an integer from 17 to 25.

In another embodiment of the non-aqueous emulsion in which Y in general formula (A) is F, as introduced above, Z in general formula (A) is —$(CF(CF_3)CF_2O)$—. In this embodiment, subscripts b, c, d, e, and g in general formula (A) are 0, and subscripts f, h, and n in general formula (A) are each independently an integer greater than 0. As but one example of this embodiment, subscripts b, c, d, e, and g in general formula (A) are 0, subscript a is at least 1, subscript f is 1, subscript h is 1, X' is an oxygen atom, subscript n is 3, and subscripts i, m, and j are each 0. In this one example, the polyfluoropolyether silane has the following general formula: F—$(CF(CF_3)$—$CF_2$—O)$_a$—$CF(CF_3)$—$CH_2$—O—$CH_2$—$CH_2$—$CH_2$—$Si$—$(X'')_{3-z}(R^2)_z$. Thus, when the hydrolysable groups represented by X'' are all alkoxy groups, e.g. methoxy groups, and z is 0, this particular polyfluoropolyether silane has the following general formula: F—$(CF(CF_3)$—$CF_2$—O)$_a$—$CF(CF_3)$—$CH_2$—O—$CH_2$—$CH_2$—$CH_2$—$Si(OCH_3)_3$. Alternatively, when the hydrolysable groups represented by X'' are all alkylamino groups, e.g. $N(CH_3)_2$ groups, this particular polyfluoropolyether silane has the following general formula: F—$(CF(CF_3)$—$CF_2$—O)$_a$—$CF(CF_3)$—$CH_2$—O—$CH_2$—$CH_2$—$CH_2$—$Si$—$(N(CH_3)_2)_3$. In these embodiments, subscript a is typically an integer from 14 to 20.

In another embodiment of the non-aqueous emulsion in which Y in general formula (A) is F and Z in general formula (A) is —$(CF(CF_3)CF_2O)$—, as introduced immediately above, subscripts b, c, d, e, and g in general formula (A) are 0, subscript a is at least 1, subscript f is 1, subscript h is 1, X' is an oxygen atom, subscript n is 3, subscripts m and i are each 1, and subscript j is 2. In this one example, the polyfluoropolyether silane has the following general formula: F—$(CF(CF_3)CF_2O)_a$—$CF(CF_3)$—$CH_2$—O—$CH_2$—$CH_2$—$CH_2$—$Si(CH_3)_2$—O—$Si(CH_3)_2$—$CH_2$—$CH_2$—$Si$—$(X'')_{3-z}(R^2)_z$. Thus, when the hydrolysable groups represented by X'' are all alkoxy groups, e.g. methoxy groups, and z is 0, this particular polyfluoropolyether silane has the following general formula: F—$(CF(CF_3)CF_2O)_a$—$CF(CF_3)$—$CH_2$—O—$CH_2$—$CH_2$—$CH_2$—$Si(CH_3)_2$—O—$Si(CH_3)_2$—$CH_2$—$CH_2$—$Si(OCH_3)_3$. In these embodiments, subscript a is typically an integer from 14 to 20.

In other embodiments, Y in general formula (A) is $(R^2)_z(X'')_{3-z}Si$—$(C_jH_{2j})$—$((SiR^1_2$—$O)_m$—$SiR^1_2)_i$—$(C_nH_{2n})$—$X'$—$(CH_2)_h$—. Typically, when Y in general formula (A) is $(R^2)_z(X'')_{3-z}Si$—$(C_jH_{2j})$—$((SiR^1_2$—$O)_m$—$SiR^1_2)_i$—$(C_nH_{2n})$—$X'$—$(CH_2)_h$—, subscripts b, c, and f in general formula (A) are 0. As such, in these embodiments, when the groups indicated by subscripts b, c, and f are absent, the polyfluoropolyether silane has the following general formula: Y—$Z_a$—$[(OCF_2CF(CF_3))_d$—$(OC_2F_4)_e$—$(OCF_2)_g]$—$(CH_2)_h$—$X'$—$(C_nH_{2n})$—$((SiR^1_2$—$O)_m$—$SiR^1_2)_i$—$(C_jH_{2j})$—$Si$—$(X'')_{3-z}(R^2)_z$.

In one embodiment in which Y in general formula (A) is $(R^2)_z(X'')_{3-z}Si$—$(C_jH_{2j})$—$((SiR^1_2$—$O)_m$—$SiR^1_2)_i$—$(C_nH_{2n})$—$X'$—$(CH_2)_h$—, as introduced immediately above, Z is —$(CF_2)$—, X' is an oxygen atom, subscripts b, c, d, and f in general formula (A) are 0, and subscripts e and g in general formula (A) are each independently an integer greater than 0. As but one example of this embodiment, Z is —$(CF_2)$—, X' is an oxygen atom, subscripts b, c, d, f, m, i, and j in general formula (A) are 0, subscript e is at least 1, subscript g is at least 1, subscript h is 1, X' is an oxygen atom, and subscript n is 3. In this one example, the polyfluoropolyether silane has the following general formula: $(R^2)_z(X'')_{3-z}Si$—$CH_2$—$CH_2$—$CH_2$—O—$CH_2$—$CF_2$—$(OCF_2CF_2)_e$—$(OCF_2)_g$—$CH_2$—O—$CH_2$—$CH_2$—$CH_2$—$Si$—$(X'')_{3-z}(R^2)_z$. Thus, when the hydrolysable groups represented by X'' are all alkoxy groups, e.g. methoxy groups, and z is 0, this particular polyfluoropolyether silane has the following general formula: $(CH_3O)_3Si$—$CH_2$—$CH_2$—$CH_2$—O—$CH_2$—$CF_2$—$(OCF_2CF_2)_e$—$(OCF_2)_g$—$CH_2$—O—$CH_2$—$CH_2$—$CH_2$—$Si$—$(OCH_3)_3$. Alternatively, when the hydrolysable groups represented by X'' are all alkylamino groups, e.g. $N(CH_3)_2$ groups, and z is 0, this particular polyfluoropolyether silane has the following general formula: $((CH_3)_2N)_3Si$—$CH_2$—$CH_2$—$CH_2$—O—$CH_2$—$CF_2$—$(OCF_2CF_2)_e$—$(OCF_2)_g$—$CH_2$—O—$CH_2$—$CH_2$—$CH_2$—$Si$—$(N(CH_3)_2)_3$.

Alternatively, in another embodiment in which Y in general formula (A) is $(R^2)_z(X'')_{3-z}Si$—$(C_jH_{2j})$—$((SiR^1_2$—$O)_m$—$SiR^1_2)_i$—$(C_nH_{2n})$—$X'$—$(CH_2)_h$—, as introduced above, Z is —$(CF_2)$—, X' is an oxygen atom, subscripts b, c, e, and f in general formula (A) are 0, and subscripts d and g in general formula (A) are each independently an integer greater than 0.

Notably, in the specific formulas provided above, which are representative of exemplary polyfluoropolyether silanes, one or more fluorine atoms of the polyfluoropolyether silane may be replaced with other atoms. For example, other halogen atoms (e.g. Cl) may be present in the polyfluoropolyether silane, or the polyfluoropolyether silane may have lesser degree of fluorination. By lesser degree of fluorination, it is meant that one or more of the fluorine atoms of any of the general formulas above may be replaced with hydrogen atoms.

Methods of preparing polyfluoropolyether silanes are generally known in the art. For example, polyfluoropolyether silanes are typically prepared via a hydrosilylation reaction between an alkenyl-terminated polyfluoropolyether compound and a silane compound having a silicon-bonded hydrogen atom. The silane compound typically includes at least one hydrolysable group, such as a silicon-bonded halogen atom. The silicon-bonded halogen atom may be reacted and converted to other hydrolysable groups. for example, the silicon-bonded halogen atom may be reacted with an alcohol such that the resulting polyfluoropolyether silane compound includes alkoxy functionality attributable to the alcohol. The byproduct of such a reaction is hydrochloric acid. One of skill in the art understands how to modify the starting components to obtain the desired structure of the polyfluoropolyether silane. Specific examples of methods for preparing various polyfluoropolyether silanes are disclosed in U.S. Publ. Pat. Appln. No. 2009/0208728, which is incorporated by reference herein in its entirety.

In various embodiments, the non-continuous phase of the non-aqueous emulsion further comprises a fluorinated vehicle. The fluorinated vehicle is different from the polyfluoropolyether silane and may, in certain embodiments, be referred to as a fluorinated solvent. In these embodiments, the fluorinated vehicle may be any fluorinated vehicle capable of solubilizing the polyfluoropolyether silane and is typically selected such that the fluorinated vehicle is non-reactive with the polyfluoropolyether silane or any other components in the non-aqueous emulsion, particularly the discontinuous phase of the non-aqueous emulsion. The fluorinated vehicle generally has a lesser molecular weight and increased volatility as compared to the polyfluoropolyether silane. Specific examples of fluorinated vehicles suitable for the discontinuous phase of the non-aqueous emulsion include polyfluorinated aliphatic hydrocarbons, such as perfluoroaliphatic $C_5$-$C_{12}$ hydrocarbons, including decafluoropentane, perfluorohexane, perfluoromethylcyclohexane, and perfluoro-1,3-dimethylcyclohexane; polyfluorinated aromatic hydrocarbons, such as bis(trifluoromethyl)benzene; hydrofluoroethers (HFEs), such as perfluorobutyl methyl ether ($C_4F_9OCH_3$), ethyl nonafluorobutyl ether ($C_4F_9OC_2H_5$), ethyl nonafluoroisobutyl ether ($C_4F_9OC_2H_5$), and like HFEs; perfluoropolyethers; perfluoroethers; nitrogen-containing polyfluorinated vehicles, such as nitrogen-containing perfluorinated vehicles; etc. Such fluorinated vehicles are known in the art and commercially available from various suppliers.

In various embodiments including the fluorinated vehicle in the discontinuous phase, the fluorinated vehicle comprises a perfluoropolyether solvent. In these embodiments, the perfluoropolyether solvent typically has a boiling point temperature of at least 40, alternatively at least 60, alternatively at least 80, alternatively at least 100, ° C. at atmospheric pressure (i.e., 101.325 kilopascals). In one specific embodiment, the perfluoropolyether solvent has a boiling point temperature of from 125 to 145, alternatively from 130 to 140, ° C. at atmospheric pressure. In another specific embodiment, the perfluoropolyether solvent has a boiling point temperature of from 160 to 180, alternatively from 165 to 175, ° C. at atmospheric pressure. Typically, the boiling point temperature of the perfluoropolyether solvent is from greater than 120 to 180, alternatively from greater than 125 to 180, alternatively from greater than 160 to 180, ° C. at atmospheric pressure. However, the depending on the molecular weight of the perfluoropolyether solvent, the boiling point temperature of the perfluoropolyether solvent may be greater than the upper range of 180° C., e.g. to 200, 230, or 270° C.

In embodiments in which the fluorinated vehicle comprises the perfluoropolyether solvent, the perfluoropolyether solvent typically has the following general formula;

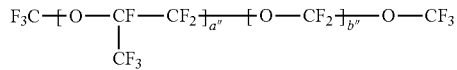

wherein a" is an integer greater than 1 and b" is 0 or greater Specifically, subscripts a" and b" of the general formula above are chosen so as to provide the desired boiling point temperature of the perfluoropolyether solvent. In particular, the relationship between subscripts a" and b", the boiling point temperature, and the molecular weight of the perfluoropolyether solvent is set forth below:

| Boiling Point (° C.) | Typical a" | Typical b" | Average MW (Da) |
|---|---|---|---|
| 125-145 | 1-3 | 1-7 | 600-620 |
| 160-180 | 1-4 | 1-10 | 750-770 |
| 190-210 | ≥1 | ≥1 | 860-880 |

-continued

| Boiling Point (° C.) | Typical a" | Typical b" | Average MW (Da) |
|---|---|---|---|
| 220-240 | ≥1 | ≥1 | 1010-1030 |
| 260-280 | ≥1 | ≥1 | 1540-1560 |

Alternatively, the fluorinated vehicle may comprise a nitrogen-containing polyfluorinated vehicle, such as a nitrogen-containing perfluorinated vehicle. In these embodiments, the nitrogen-containing perfluorinated or polyfluorinated vehicle is typically a tertiary amine in which the nitrogen atom is a center atom having three polyfluorinated substituents such as three perfluorinated substituents, optionally including heteroatoms, such as oxygen, nitrogen, and/or sulfur. Typically, each of the substituents bonded to the nitrogen atom are identical, although these substituents may differ in terms of the number of carbon atoms present, the presence or absence of heteroatoms, and/or fluorine content. These substituents generally independently include from 2 to 10 carbon atoms, and are typically perfluorinated. As but one example of such a nitrogen-containing perfluorinated vehicle, a structure representative of $C_{12}F_{27}N$ is set forth below for illustrative purposes only:

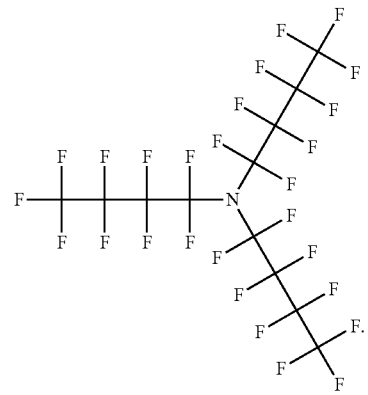 [SMILES: FC(F)(F)C(F)(F)C(F)(F)C(F)(F)N(C(F)(F)C(F)(F)C(F)(F)C(F)(F)F)C(F)(F)C(F)(F)C(F)(F)C(F)(F)F]

Typically, when the fluorinated vehicle comprises the nitrogen-containing perfluorinated or polyfluorinated vehicle, the solvent comprises a combination of different nitrogen-containing perfluorinated or polyfluorinated vehicles.

The discontinuous phase of the non-aqueous emulsion may utilize a single fluorinated vehicle or a combination of two or more fluorinated vehicles. Such fluorinated vehicles may be linear, branched, cyclic, alicyclic, aromatic, or may contain combinations thereof. In certain embodiments, the fluorinated vehicle is not perfluorinated. In these embodiments, the solvent is typically polyfluorinated and may be selected from polyfluorinated aromatic hydrocarbons, such as bis(trifluoromethyl)benzene; polyfluorinated aliphatic hydrocarbons; (HFEs), such as perfluorobutyl methyl ether, ethoxy-nonafluorobutane, and like HFEs, and combinations thereof. Typically, the fluorinated vehicle comprises an HFE.

When the discontinuous phase of the non-aqueous emulsion further comprises the fluorinated vehicle, the fluorinated vehicle and the polyfluoropolyether silane may be present in the discontinuous phase in various amounts or ratios as compared to one another. Generally, the polyfluoropolyether silane is combined with the fluorinated vehicle prior to forming the non-aqueous emulsion for obtaining better self-emulsification properties during preparation of the non-aqueous emulsion.

To this end, the discontinuous phase may comprise the polyfluoropolyether silane in an amount of 100 parts by weight based on 100 parts by weight of the discontinuous phase of the non-aqueous emulsion (when the discontinuous phase does not include the fluorinated vehicle). Alternatively, in embodiments including the fluorinated vehicle in the discontinuous phase, the polyfluoropolyether silane is typically present in the discontinuous phase in an amount of from greater than 0 to less than 100 based on 100 parts by weight of the discontinuous phase, with the actual value being chosen based on the desired physical properties of the non-aqueous emulsion. For example, repeatability of the non-aqueous emulsion generally decreases when the discontinuous phase comprises the polyfluoropolyether silane in an amount of greater than 50 parts by weight based on 100 parts by weight of the discontinuous phase. Accordingly, in certain embodiments, the discontinuous phase comprises the polyfluoropolyether silane in an amount of from 1 to 50, alternatively from 10-30, alternatively from 15-25, alternatively from 18-22, parts by weight based on 100 parts by weight of the discontinuous phase. The balance of the discontinuous phase is generally the fluorinated vehicle. Said differently, the discontinuous phase typically comprises the fluorinated vehicle in an amount of from 51 to 99, alternatively from 70 to 90, alternatively from 75-85, alternatively from 78-82, parts by weight based on 100 parts by weight of the discontinuous phase. In certain embodiments, the polyfluoropolyether silane and the fluorinated vehicle have similar densities such that the parts by weight described above may alternatively be referred to as parts by volume, i.e., these ranges also apply to the relative volumes of the polyfluoropolyether silane and the fluorinated vehicle in the discontinuous phase in these embodiments.

The relative amount of the discontinuous phase present in the non-aqueous emulsion is generally contingent on whether the discontinuous phase further includes the fluorinated vehicle. For example, in embodiments excluding the fluorinated vehicle from the discontinuous phase, the discontinuous phase is typically present in the non-aqueous emulsion in an amount of from greater than 0 to 1.0, alternatively from greater than 0 to 0.50, alternatively from 0.10 to 0.30, alternatively from 0.15 to 0.25, percent by weight based on the total weight of the non-aqueous emulsion. In these embodiments, the discontinuous phase consists essentially of, or consists of, the polyfluoropolyether silane. In these embodiments, the discontinuous phase is typically present in the non-aqueous emulsion in an amount of from greater than 0 to 0.56, alternatively from greater than 0 to 0.28, alternatively from 0.06 to 0.17, alternatively from 0.08 to 0.14, percent by volume based on the total volume of the non-aqueous emulsion.

Alternatively, in embodiments including the fluorinated vehicle in the discontinuous phase, the discontinuous phase is typically present in the non-aqueous emulsion in an amount of from greater than 0 to 10, alternatively from greater than 0 to 5, alternatively from 0.25 to 2.0, alternatively from 0.75 to 1.25, percent by weight based on the total weight of the non-aqueous emulsion. In these embodiments, the discontinuous phase typically comprises the polyfluoropolyether silane and the fluorinated vehicle in the amounts set forth immediately above. In these embodiments, the discontinuous phase is typically present in the non-aqueous emulsion in an amount of from greater than 0 to 5.86, alternatively from greater than 0 to 2.86, alternatively from 0.14 to 1.13, alternatively from 0.42 to 0.70, percent by volume based on the total volume of the non-aqueous emulsion.

Accordingly, in certain embodiments, the discontinuous phase comprises the polyfluoropolyether silane in a concentration of from 1 to 50, alternatively from 10-30, alternatively from 15-25, alternatively from 18-22, parts by weight based on 100 parts by weight of the discontinuous phase. The balance of the discontinuous phase is generally the fluorinated vehicle. Said differently, the discontinuous phase typically comprises the fluorinated vehicle in an amount of from 51 to 99, alternatively from 70 to 90, alternatively from 75-85, alternatively from 78-82, parts by weight based on 100 parts by weight of the discontinuous phase. In certain embodiments, the polyfluoropolyether silane and the fluorinated vehicle have similar densities such that the parts by weight described above may alternatively be referred to as parts by volume, i.e., these ranges also apply to the relative volumes of the polyfluoropolyether silane and the fluorinated vehicle in the discontinuous phase in these embodiments.

The concentrations of the polyfluoropolyether silane and the fluorinated vehicle in the discontinuous phase of the non-aqueous emulsion may vary from the ranges set forth immediately above contingent on the absence or presence of various optional components employed in the non-aqueous emulsion, as described in greater detail below.

As introduced above, the non-aqueous emulsion further comprises a continuous phase comprising an organic vehicle. The organic vehicle of the continuous phase may be any organic vehicle capable of emulsifying the polyfluoropolyether silane (and optionally the fluorinated vehicle). The organic vehicle is generally referred to as an organic vehicle as opposed to an organic solvent because the organic vehicle need only disperse or emulsify the discontinuous phase, but not solubilize the discontinuous phase.

In a first embodiment, the non-aqueous emulsion exhibits the Tyndall effect for a period of time. The Tyndall effect, which is also referred to as Tyndall scattering, is understood in the art to refer to light scattering by particles in a colloid, suspension, or emulsion. More specifically, under the Tyndall effect, shorter-wavelength light is reflected via scattering, whereas longer-wavelength light is transmitted. In the non-aqueous emulsion, the light scattering is generally attributable to the discontinuous phase, which is present in the form of dispersed particles in the continuous phase. In particular, the organic vehicle of the continuous phase is generally a light-transmitting medium, whereas the polyfluoropolyether silane of the discontinuous phase is generally a light-scattering medium.

The organic vehicle may be combined with the polyfluoropolyether silane (either singularly or optionally in combination with the fluorinated vehicle) to readily determine whether the resulting mixture exhibits the Tyndall effect for a period of time. This determination is generally made via visual or optical inspection. In particular, to determine whether a particular organic vehicle is suitable for the purpose of the non-aqueous emulsion, the polyfluoropolyether silane is combined with the fluorinated vehicle to prepare a fluorinated composition, and the fluorinated composition is combined with the organic vehicle. The fluorinated composition generally self-disperses in the organic vehicle such that the fluorinated composition and the organic vehicle self-emulsify and exhibit the Tyndall effect for a period of time (in the case of a suitable organic vehicle) in the resulting non-aqueous emulsion. Generally, if the resulting mixture exhibits the Tyndall effect for a period of time, the resulting mixture is a non-aqueous emulsion. Said differently, when the resulting mixture does not exhibit the Tyndall effect for a period of time, an emulsion generally does not form from the organic vehicle and the polyfluoropolyether silane. In these embodiments, i.e., when no Tyndall effect is exhibited, the resulting mixture typically settles and/or precipitates.

For example, to readily determine whether a particular organic vehicle is suitable for preparing a non-aqueous emulsion that exhibits the Tyndall effect for a period of time, 0.02 grams of the polyfluoropolyether silane may be combined with 0.08 grams of the fluorinated vehicle to form the fluorinated composition. The fluorinated composition, having a mass of 0.10 grams, may be disposed in 9.90 grams of the organic vehicle dropwise to form a mixture. The mixture can be shaken or stirred to determine whether the mixture emulsifies to prepare the non-aqueous emulsion that exhibits the Tyndall effect for a period of time. Although other amounts of the organic vehicle, the polyfluoropolyether silane, and/or the fluorinated vehicle may be utilized, this procedure allows for high throughput analysis of numerous organic vehicles at a reproducible and repeatable basis. Further, this procedure allows for a quick determination of whether the particular organic vehicle is suitable for preparing a non-aqueous emulsion that exhibits the Tyndall effect while requiring only minimal amounts of the organic vehicle, the polyfluoropolyether silane, and the fluorinated vehicle.

Generally, the greater the period of time during which the non-aqueous emulsion exhibits the Tyndall effect, the greater the shelf-life and stability of the non-aqueous emulsion. In various embodiments, the organic vehicle is selected such that the non-aqueous emulsion exhibits the Tyndall effect for a period of time of greater than 0 seconds, alternatively at least 5 seconds, alternatively at least 1 minute, alternatively at least 5 minutes, alternatively at least 1 hour, alternatively at least 8 hours, alternatively at least 1 day, alternatively at least 2 days, alternatively at least 1 week, alternatively at least 1 month, alternatively at least 1 year, alternatively up to 50 years. Generally, the non-aqueous emulsion no longer exhibits the Tyndall effect once the non-aqueous emulsion substantially settles or otherwise becomes a heterogeneous mixture. In these embodiments, the non-aqueous emulsion may typically be re-formed by applying a shear force to the heterogeneous mixture, such as by shaking or stirring. Said differently, the components, if settled, generally once again form the non-aqueous emulsion upon application of a shear force. In certain embodiments, the non-aqueous emulsion may exhibit the Tyndall effect perpetually, i.e., the non-aqueous emulsion may not settle and has excellent long term stability.

Various classes of organic vehicles are suitable for the continuous phase of the non-aqueous emulsion. For example, the organic vehicle may be aliphatic, aromatic, cyclic, alicyclic, etc. Although the organic vehicle is generally derived from a hydrocarbon, the organic vehicle may include ethylenic unsaturation and may be substituted or unsubstituted. By "substituted," it is meant that one or more hydrogen atoms of the organic vehicle may be replaced with atoms other than hydrogen (e.g. a halogen atom, such as chlorine, fluorine, bromine, etc.) or substituents other than hydrogen (e.g. a carbonyl group, an amine group, etc.), or a carbon atom within the organic vehicle may be replaced with an atom other than carbon, i.e., the organic vehicle may include one or more heteroatoms, such as oxygen, sulfur, nitrogen, etc.

In certain embodiments, the organic vehicle comprises an ester. Specific examples of esters suitable for the purposes of the organic vehicle include n-butyl acetate, t-butyl acetate, methyl 10-undecenoate, t-butyl acetoacetate, isoamyl acetate, dimethyl fumarate, diethyl fumarate, propylene glycol monomethyl ether acetate, and combinations thereof. In other embodiments, the organic vehicle comprises a ketone. Specific examples of ketones suitable for the purposes of the organic vehicle include acetone, t-butyl acetoacetate (which constitutes both an ester and a ketone), methyl isobutyl ketone, 2-pentanone, 2-butanone, acetylacetone, and combinations thereof. The continuous phase of the non-aqueous emulsion may comprise combinations of esters, combinations of ketones, combinations of esters and ketones, or a ketone and/or an ester in combination with another organic vehicle and/or solvent.

The organic vehicle is not limited to esters or ketones. For example, in various embodiments, the organic vehicle is selected from the group consisting of t-butyl acetate, acetone, tetrahydrofuran, n-butyl acetate, dimethyl sulfoxide, methylene chloride, diglyme, tetraethylene glycol dimethyl ether, triethylene glycol dimethyl ether, methyl 10-undecenoate, dimethylformamide, t-butyl acetoacetate, methyl isobutyl ketone, 2-pentanone, 2-butanone, acetylacetone, limonene, xylene, propylene carbonate, isopropanol, 1-methoxy-2-propanol, propylene glycol monomethyl ether acetate, isoamyl acetate, diethyl fumarate, t-butanol, 1-butanol, t-butyl methyl ether, toluene, ethylene glycol, and combinations thereof.

In specific embodiments, the organic vehicle is selected from the group consisting of acetone, dimethyl sulfoxide, methylene chloride, xylene, n-butyl acetate, propylene carbonate, tetraethylene glycol dimethyl ether, triethylene glycol dimethyl ether, methyl isobutyl ketone, isoamyl acetate, diethyl fumarate, t-butanol, 2-butanone, tetrahydrofuran, t-butyl acetate, and combinations thereof. In other specific embodiments, the organic vehicle is selected from the group consisting of acetone, n-butyl acetate, triethylene glycol dimethyl ether, methyl isobutyl ketone, 2-pentanone, 2-butanone, tetrahydrofuran, t-butyl acetate, and combinations thereof.

In a second embodiment, the organic vehicle is selected from the group consisting of t-butyl acetate, acetone, tetrahydrofuran, n-butyl acetate, dimethyl sulfoxide, methylene chloride, diglyme, tetraethylene glycol dimethyl ether, triethylene glycol dimethyl ether, methyl 10-undecenoate, dimethylformamide, t-butyl acetoacetate, methyl isobutyl ketone, 2-pentanone, 2-butanone, acetylacetone, limonene, xylene, propylene carbonate, isopropanol, 1-methoxy-2-propanol, propylene glycol monomethyl ether acetate, isoamyl acetate, diethyl fumarate, t-butanol, 1-butanol, t-butyl methyl ether, toluene, ethylene glycol, and combinations thereof. In this second embodiment, the non-aqueous emulsion need not exhibit the Tyndall effect for a period of time, as in the first embodiment. However, the non-aqueous emulsion generally exhibits the Tyndall effect even in this second embodiment. As such, in certain embodiments, the additional description regarding the Tyndall effect above relative to the first embodiment is also applicable to this second embodiment.

The following description is generally applicable to both the first and second embodiments of the non-aqueous emulsion.

The continuous phase of the non-aqueous emulsion may consist essentially of, or consist of, the organic vehicle. The continuous phase of the non-aqueous emulsion typically comprises the organic vehicle in an amount of at least 10, alternatively at least 20, alternatively at least 30, alternatively at least 40, alternatively at least 50, alternatively at least 60, alternatively at least 70, alternatively at least 80, alternatively at least 90, alternatively at least 95, alternatively at least 96, alternatively at least 97, alternatively at least 98, alternatively at least 99, percent by weight based on the total weight of the continuous phase. In these embodiments, the continuous phase of the non-aqueous emulsion typically comprises the organic vehicle in an amount of at least 16.56, alternatively at least 30.86, alternatively at least 43.35, alternatively at least 54.35, alternatively at least 64.10, alternatively at least 72.82, alternatively at least 80.65, alternatively at least 87.72, alternatively at least 94.14, alternatively at least 97.14, alternatively at least 97.72, alternatively at least 98.30, alternatively at least 98.87, alternatively at least 99.44, percent by volume based on the total volume of the continuous phase. For example, if desired, the non-aqueous emulsion may be a concentrate in which the continuous phase is minimized in the ranges set forth above and the discontinuous phase is maximized. Alternatively, to reduce overall cost of the non-aqueous emulsion, the continuous phase may be maximized in the ranges set forth above. The amount of the organic vehicle in the continuous phase may vary from the ranges set forth immediately above contingent on the absence or presence of various optional components employed in the non-aqueous emulsion, as described in greater detail below.

The amount of the continuous phase present in the non-aqueous emulsion is contingent on the amount of the discontinuous phase present in the non-aqueous emulsion, which is largely based on the presence or absence of the fluorinated vehicle.

For example, in embodiments excluding the fluorinated vehicle from the discontinuous phase, the continuous phase is typically present in the non-aqueous emulsion in an amount of from 99.0 to less than 100, alternatively from 99.5 to less than 100, alternatively from 99.7 to 99.9, percent by weight based on the total weight of the non-aqueous emulsion. In these embodiments, the continuous phase is typically present in the non-aqueous emulsion in an amount of from 99.44 to less than 100, alternatively from 99.72 to less than 100, alternatively from 99.83 to less than 100, alternatively from 99.9 to less than 100, percent by volume based on the total volume of the non-aqueous emulsion.

Alternatively, in embodiments including the fluorinated vehicle in the discontinuous phase, the continuous phase is typically present in the non-aqueous emulsion in an amount of from 70 to less than 100, alternatively from 80 to less than 100, alternatively from 90 to less than 100, alternatively from 95 to less than 100, alternatively from 98.0 to 99.75, alternatively from 98.75 to 99.25, percent by weight based on the total weight of the non-aqueous emulsion. In these embodiments, the continuous phase is typically present in the non-aqueous emulsion in an amount of from 80.65 to less than 100, alternatively from 87.72 to less than 100, alternatively from 94.14 to less than 100, alternatively from 97.14 to less than 100, alternatively from 98.87 to 99.86, alternatively from 99.3 to 99.58, percent by volume based on the total volume of the non-aqueous emulsion.

As understood in the art, the discontinuous phase typically has a greater density than the continuous phase. As such, based on a selection of the discontinuous phase and the continuous phase, the relative weights or masses and corresponding volumes of the discontinuous phase and the continuous phase may vary.

The discontinuous phase generally forms particles in the continuous phase of the non-aqueous emulsion. The particles are liquid and may alternatively be referred to as droplets. The size of the particles is typically contingent on, for example, whether the discontinuous phase also comprises the fluorinated vehicle, and the relative amounts of the polyfluoropolyether silane and the fluorinated vehicle in the discontinuous phase. In certain embodiments, the particles have an average particle size of from 0.01 to 2.0, alternatively from 0.05 to 1.5, alternatively from 0.1 to 1.0, alternatively from 0.15 to 0.5, alternatively from 0.20 to 0.40, micrometers, as measured via a dynamic light scattering technique. As understood in the art, the average particle size may vary dependent on the technique utilized to measure the average particle size, and techniques other than dynamic light scattering may be utilized herein.

The average particle size of the discontinuous phase of the non-aqueous emulsion may be selectively controlled. In particular, when the discontinuous phase comprises the fluorinated vehicle in combination with the polyfluoropolyether silane, increasing the concentration of the fluorinated vehicle (i.e., decreasing the concentration of the polyfluoropolyether silane) in the fluorinated concentration results in smaller particle sizes. As such, modifying the relative amounts of the fluorinated vehicle and the polyfluoropolyether silane in the fluorinated composition impacts particle size of the discontinuous phase of the non-aqueous emulsion.

In one specific embodiment, the non-aqueous emulsion comprises the organic vehicle in an amount of from 90 to 99.9, alternatively from 95 to 99.8, alternatively from 98 to 99.7, percent by weight based on the total weight of the non-aqueous emulsion. In this embodiment, the non-aqueous emulsion comprises the fluorinated vehicle in an amount of from greater than 0 to 5, alternatively from 0.15 to 2.5, alternatively from 0.30 to 2.0, percent by weight based on the total weight of the non-aqueous emulsion. Finally, in this embodiment, the non-aqueous emulsion comprises the polyfluoropolyether silane in an amount of from greater than 0 to 1, alternatively from 0.05 to 0.5, alternatively from 0.1 to 0.3, percent by weight based on the total weight of the non-aqueous emulsion. In this specific embodiment, the non-aqueous emulsion comprises the organic vehicle in an amount of from 94.14 to 99.94, alternatively from 97.14 to 99.89, alternatively from 98.87 to 99.83, percent by volume based on the total volume of the non-aqueous emulsion. In this embodiment, the non-aqueous emulsion comprises the fluorinated vehicle in an amount of from greater than 0 to 2.86, alternatively from 0.08 to 1.42, alternatively from 0.17 to 1.13, percent by volume based on the total volume of the non-aqueous emulsion. Finally, in this embodiment, the non-aqueous emulsion comprises the polyfluoropolyether silane in an amount of from greater than 0 to 0.56, alternatively from 0.03 to 0.28, alternatively from 0.06 to 0.17, percent by volume based on the total volume of the non-aqueous emulsion.

In various embodiments, the non-aqueous emulsion further comprises a surfactant. The surfactant may be present in the continuous phase and/or the discontinuous phase (or at an interface thereof). The surfactant may be nonionic, anionic, cationic, amphoteric, or Zwitterionic. The surfactant may be, for example, monomeric, oligomeric, or polymeric in nature. While surfactants are generally required in conventional emulsions, because the instant non-aqueous emulsion is generally prepared via self-emulsification in the absence of significant shear, the instant non-aqueous emulsion may be prepared in the absence of any surfactants. If utilized, the surfactant may be present at an interface between the continuous and discontinuous phase, contingent on its ionicity and other physical properties. The surfactant may additionally or alternatively be present in the continuous and/or discontinuous phase of the non-aqueous emulsion. Further, if utilized, the surfactant is typically present in the non-aqueous emulsion in an amount of less than 1, alternatively less than 0.1, alternatively less than 0.01, percent by weight based on the total weight of the non-aqueous emulsion. However, because the surfactant is not required to prepare the instant non-aqueous emulsion, in certain embodiments, the non-aqueous emulsion consists essentially of, or consists of, the organic vehicle in the continuous phase and the fluorinated vehicle and the polyfluoropolyether silane in the discontinuous phase.

The non-aqueous emulsion may additionally include any other suitable component(s), such as a coupling agent, an antistatic agent, an ultraviolet absorber, a plasticizer, a leveling agent, a pigment, a catalyst, and so on. Such components may be present in the continuous phase and/or the discontinuous phase of the non-aqueous emulsion.

Catalysts may optionally be utilized to promote surface modification by the non-aqueous emulsion. These catalysts may promote the reaction between any hydrolysable groups of the polyfluoropolyether silane and the surface of the article. These catalysts can be used individually or as a combination of two or more in the non-aqueous emulsion. Examples of suitable catalytic compounds include acids, such as carboxylic acids, e.g. formic acid, acetic acid, propionic acid, butyric acid, and/or valeric acid; bases; metal salts of organic acids, such as dibutyl tin dioctoate, iron stearate, and/or lead octoate; titanate esters, such as tetraisopropyl titanate and/or tetrabutyl titanate; chelate compounds, such as acetylacetonato titanium; aminopropyltriethoxysilane, and the like. If utilized, the catalysts are typically utilized in an amount of from greater than 0 to 5, alternatively 0.0001 to 1, alternatively 0.001 to 0.1, percent by weight, based on 100 parts by weight of the non-aqueous emulsion.

Alternatively or in addition to the above, the non-aqueous emulsion may further comprise various additive compounds for improving adhesion and/or durability of the layer formed from the non-aqueous emulsion. Examples of additive compounds are silanes, such as tetrakis(dimethylamine)silane, tetraethylorthosilicate, glycidoxypropyltrimethoxysilane, triethylsilane, isobutyltrimethoxysilane; and siloxanes, such as heptamethyltrisiloxane, tetramethyldisiloxane etc.

The non-aqueous emulsion may be prepared via various methods. Typically, the organic vehicle and the polyfluoropolyether silane are combined to prepare the non-aqueous emulsion.

The organic vehicle and the polyfluoropolyether silane may be combined in various manners. For example, the organic vehicle may be added to the polyfluoropolyether silane, or the polyfluoropolyether silane may be added to the organic vehicle, optionally in the presence of a stirrer or mixer, which may be utilized during and/or after combining the organic vehicle and the polyfluoropolyether silane.

In various embodiments, the step of combining the organic vehicle and the polyfluoropolyether silane comprises disposing the polyfluoropolyether silane in the organic vehicle. The polyfluoropolyether silane may be disposed in the organic vehicle manually (e.g. with a pipette or other glassware) or with an appropriate dispensing apparatus.

Typically, the polyfluoropolyether silane is combined with the fluorinated vehicle to form the fluorinated composition, and the fluorinated composition is disposed in the organic vehicle to prepare the non-aqueous emulsion.

As introduced above, the fluorinated composition (or just the polyfluoropolyether silane, as the case may be) generally self-disperses and self-emulsifies in the organic vehicle once combined with the organic vehicle. As such, in various embodiments, the method of preparing the non-aqueous emulsion is free from the step of applying any substantial shear forces to the non-aqueous emulsion, which is generally required in the preparation of conventional emulsions. Alternatively, the components may be vortexed or otherwise mixed to prepare the non-aqueous emulsion. For example, minimal shear, such as swirling the non-aqueous emulsion gently by hand or via a mixing device is sufficient for initiating self-emulsification of the components of the non-aqueous emulsion.

As set forth above, the present invention further provides a surface-treated article and methods of preparing surface-treated articles, which are described collectively in greater detail below.

The surface-treated article comprises an article presenting a surface. A layer is deposited on the surface of the article. The layer is formed from the non-aqueous emulsion, which is applied on the surface of the article to prepare the surface-treated article. For example, the method of preparing the surface-treated article comprises applying the non-aqueous emulsion on the surface of the article to form a wet layer thereof on the surface of the article. The method further comprising removing the organic vehicle from the wet layer to form a layer on the surface of the article and give the surface-treated article. Although the article may be any article, because of the excellent physical properties obtained from the non-aqueous emulsion of the present invention, the article is typically an electronic article, an optical article, consumer appliances and components, automotive bodies and components, etc. Most typically, the article is an article for which it is desirable to reduce stains and/or smudges resulting from fingerprints or skin oils.

Examples of electronic articles typically include those having electronic displays, such as LCD displays, LED displays, OLED displays, plasma displays, etc. These electronic displays are often utilized in various electronic devices, such as computer monitors, televisions, smart phones, GPS units, music players, remote controls, hand-held video games, portable readers, etc. Exemplary electronic articles include those having interactive touch-screen displays or other components which are often in contact with the skin and which oftentimes display stains and/or smudges.

As introduced above, the article may also be a metal article, such as consumer appliances and components. Exemplary articles are a dishwasher, a stove, a microwave, a refrigerator, a freezer, etc, typically those having a glossy metal appearance, such as stainless steel, brushed nickel, etc.

Alternatively, the article may be a vehicle body or component such as an automotive body or component. For example, the non-aqueous emulsion may be applied directly on a top coat of an automobile body to form the layer, which imparts the automobile body with a glossy appearance, which is aesthetically pleasing and resists stains, such as dirt, etc., as well as smudges from fingerprints.

Examples of suitable optical articles include inorganic materials, such as glass plates, glass plates comprising an inorganic layer, ceramics, and the like. Additional examples of suitable optical articles include organic materials, such as transparent plastic materials and transparent plastic materials comprising an inorganic layer, etc. Specific examples of optical articles include antireflective films, optical filters, optical lenses, eyeglass lenses, beam splitters, prisms, mirrors, etc.

Among organic materials, examples of transparent plastic materials include materials comprising various organic polymers. From the view point of transparency, refractive index, dispersibility and like optical properties, and various other properties such as shock resistance, heat resistance and durability, materials used as optical members usually comprise polyolefins (polyethylene, polypropylene, etc.), polyesters (polyethylene terephthalate, polyethylene naphthalate, etc.), polyamides (nylon 6, nylon 66, etc.), polystyrene, polyvinyl chloride, polyimides, polyvinyl alcohol, ethylene vinyl alcohol, acrylics, celluloses (triacetylcellulose, diacetylcellulose, cellophane, etc.), or copolymers of such organic polymers. It is to be appreciated that these materials may be utilized in ophthalmic elements. Non-limiting examples of ophthalmic elements include corrective and non-corrective lenses, including single vision or multi-vision lenses like bifocal, trifocal and progressive lenses, which may be either segmented or non-segmented, as well as other elements used to correct, protect, or enhance vision, including without limitation contact lenses, intra-ocular lenses, magnifying lenses and protective lenses or visors. Preferred material for ophthalmic elements comprises one or more polymers selected from polycarbonates, polyamides, polyimides, polysulfones, polyethylene terephthalate and polycarbonate copolymers, polyolefins, especially polynorbornenes, diethylene glycolbis(allyl carbonate) polymers—known as CR39—and copolymers, (meth)acrylic polymers and copolymers, especially (meth)acrylic polymers and copolymers derived from bisphenol A, thio(meth)acrylic polymers and copolymers, urethane and thiourethane polymers and copolymers, epoxy polymers and copolymers, and episulfide polymers and copolymers.

In addition to the articles described above, the non-aqueous emulsion of the invention can be applied to form the layer on other articles, such as window members for automobiles or airplanes, thus providing advanced functionality. To further improve surface hardness, it is also possible to perform surface modification by a so-called sol-gel process using a combination of the non-aqueous emulsion and TEOS (tetraethoxysilane).

One particular substrate of interest on which the non-aqueous emulsion may be applied to form the layer is any generation of Gorilla® Glass, commercially available from Corning Incorporated of Corning, N.Y. Another particular substrate of interest is Dragontrail® glass, commercially available from Asahi Glass Company of Tokyo, Japan.

The method by which the non-aqueous emulsion is applied on the surface of the article to prepare the surface-treated article may vary.

For example, in certain embodiments, the step of applying the non-aqueous emulsion on the surface of the article to form the wet layer uses a wet coating application method. Specific examples of wet coating application methods suitable for the method include dip coating, spin coating, flow coating, spray coating, roll coating, gravure coating, sputtering, slot coating, inkjet printing, and combinations thereof. The organic vehicle may be removed from the wet layer via heating or other known methods.

In other embodiments, the step of applying the non-aqueous emulsion on the surface of the article may comprise forming the layer on the surface of the article with a deposition apparatus. For example, when the deposition apparatus is utilized, the deposition apparatus typically comprises a physical vapor deposition apparatus. In these embodiments, the deposition apparatus is typically selected from a sputtering apparatus, an atomic layer deposition apparatus, a vacuum apparatus, and a DC magnetron sputtering apparatus. The optimum operating parameters of each of these physical deposition vapor apparatuses are based upon the non-aqueous emulsion utilized, the article on which the layer is to be formed, etc. In certain embodiments, the deposition apparatus comprises a vacuum apparatus.

For example, when the layer is formed via physical vapor deposition (PVD), the method comprises combining the non-aqueous emulsion and a pellet to form an impregnated pellet. The pellet typically comprises a metal, alloy, or other robust material, such as iron, stainless steel, aluminum, carbon, copper, ceramic, etc. Typically, the pellet has a very high surface area to volume ratio for contacting the polyfluoropolyether silane of the non-aqueous emulsion. The surface area to volume ratio of the pellet may be attributable to porosity of the pellet, i.e., the pellet may be porous. Alternatively, pellet may comprise woven, unwoven, and/or randomized fibers, such as nanofibers, so as to provide the desired surface area to volume ratio. The pellet may comprise a material selected from, for example, $SiO_2$, $TiO_2$, $ZrO_2$, MgO, $Al_2O_3$, $CaSO_4$, Cu, Fe, Al, stainless steel, carbon, or combinations thereof. The material may be a plug within a casing, which comprises the metal, alloy, or other robust material. The non-aqueous emulsion may be introduced in or to the pellet in any manner so long as the material of the pellet and the polyfluoropolyether silane are combined or otherwise contacted. For example, the pellet may be submerged in the non-aqueous emulsion, or the non-aqueous emulsion may be disposed within the casing such that the porous material is impregnated with the non-aqueous emulsion. Alternatively, the pellet may be submerged in the organic vehicle, or the organic vehicle may be disposed within the casing such that the material of the pellet is impregnated with the organic vehicle, and then the polyfluoropolyether silane, or the fluorinated composition, is disposed in the organic vehicle within the casing such that the material of the pellet is impregnated with the non-aqueous emulsion, which is formed in situ in or on the pellet. In these embodiments, the method further comprises removing the organic vehicle (and the fluorinated vehicle, if present) from the impregnated pellet to form a neat pellet prior to deposition. For example, the organic vehicle (and the fluorinated vehicle, if present) may be flashed from the pellet via the application of heat. Alternatively, the organic vehicle (and the fluorinated vehicle, if present) may be removed from the pellet by drying at room temperature or a slightly elevated temperature, optionally in the presence of a vacuum or purging air.

The neat pellet may be stored until utilized in the deposition apparatus. In various embodiments, the neat pellet is stored in a vacuum-sealed aluminum bag.

Once specific example of a vacuum apparatus suitable for forming the layer from the non-aqueous emulsion is an HVC-900DA vacuum apparatus, commercially available from Hanil Vacuum Machine Co., Ltd. of Incheon, South Korea. Another example of a deposition apparatus is an Edwards AUTO 306, commercially available from Edwards of Sanborn, N.Y.

The neat pellet is generally placed on a substrate in a chamber of the deposition apparatus along with the article to be coated and the polyfluoropolyether silane is volatilized via resistive heat evaporation, thereby forming the layer on the surface of the article.

Independent of the method by which the layer is formed, once the layer is formed on the surface of the article from the non-aqueous emulsion, the layer may further undergo heating, humidification, catalytic post treatment, photoirradiation, electron beam irradiation, etc. For example, when the non-aqueous emulsion is applied via the deposition apparatus, the layer formed therefrom is generally heated at an elevated temperature, e.g. 80-150° C., for a period of time, e.g. 45-75 minutes. Alternatively, the layer formed from the non-aqueous emulsion may be allowed to stand at room temperature and ambient conditions for a period of time, e.g. 24 hours.

Typically, the thickness of the layer formed from the non-aqueous emulsion is from 1-1,000, alternatively 1-200, alternatively 1-100, alternatively 5-75, alternatively 10-50, nanometers (nm).

As noted above, layers formed from the non-aqueous emulsion may have an excellent (i.e., low) coefficient of friction and excellent (i.e., high) durability. This is true regardless of whether the non-aqueous emulsion is applied via a wet coating method or via the deposition apparatus. For example, sliding (kinetic) coefficient of friction may be measured by disposing an object having a determined surface area and mass onto a surface-treated article including a layer formed from the non-aqueous emulsion with a select material (e.g. a standard piece of legal paper) between the object and the layer. A force is then applied perpendicular to gravitational force to slide the object across the layer for a predetermined distance, which allows for a calculation of the sliding coefficient of friction of the layer. The sliding coefficient of friction may vary depending not only on the relative amounts of the discontinuous phase and the continuous phase in the non-aqueous emulsion, but also on the particular polyfluoropolyether silane utilized in the non-aqueous emulsion. Durability of the layers formed from the non-aqueous emulsion is generally measured via the water contact angles of the layers after subjecting the layers to an abrasion test. For example, for layers having a lesser durability, the water contact angle decreases after abrasion, which generally indicates that the layer has at least partially deteriorated.

In certain embodiments, the layers formed from the non-aqueous emulsion have a water contact angle of from 75 to 150, alternatively from 80-125, alternatively from 90-110, before and after subjecting the layers to the abrasion test. In these embodiments, the layers also typically have a sliding (kinetic) coefficient of friction of less than 0.2, alternatively less than 0.15, alternatively less than 0.125, alternatively less than 0.10, alternatively less than 0.75, alternatively less than 0.50, (μ). Although coefficient of friction is unitless, it is often represented by (μ).

The non-aqueous emulsion of the present invention forms layers having physical properties that are excellent as compared to the physical properties of conventional layers formed from conventional surface treatment compositions. Moreover, the non-aqueous emulsion of the present invention may be prepared at a fraction of the cost of conventional surface treatment compositions and with significantly lower toxicity due to the significant presence of the organic vehicle (which results in a significant absence of the fluorinated vehicle) in the non-aqueous emulsion, which has a reduced cost and an improved health and environmental profile as compared to conventional solvents required to attain miscibility in conventional surface treatment compositions.

It is to be understood that the appended claims are not limited to express and particular compounds, non-aqueous emulsions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention.

EXAMPLES

Various organic vehicles are analyzed or screened for purposes of preparing non-aqueous emulsions in accordance with the subject disclosure. In particular, 40 different organic vehicles are utilized or screened for purposes of preparing 40 different non-aqueous emulsions (although, as described below, some of the organic vehicles did not prepare non-aqueous emulsions).

Table 1 below illustrates the components utilized to prepare the 40 different non-aqueous emulsions (to the extent non-aqueous emulsions form from the 40 different organic vehicles) along with their respective amounts. In each of the Synthesis Examples below, the fluorinated vehicle is combined with the polyfluoropolyether silane to form a fluorinated composition. Each fluorinated composition is then added to the particular organic vehicle dropwise via an extended fine tip small bulb pipette to prepare 40 different non-aqueous emulsions (although, as described below, some of the organic vehicles did not prepare non-aqueous emulsions).

TABLE 1

| | Continuous Phase | | Discontinuous Phase | | | |
|---|---|---|---|---|---|---|
| Synthesis Example | Organic Vehicle | Amount (g) | Fluorinated vehicle | Amount (g) | Poly-fluoro-polyether (PFPE) Silane | Amount (g) |
| Synthesis Example 1 | Organic Vehicle 1 | 10.2800 | Fluorinated Vehicle 1 | 0.0736 | PFPE Silane 1 | 0.0184 |
| Synthesis Example 2 | Organic Vehicle 2 | 9.9720 | Fluorinated Vehicle 1 | 0.0584 | PFPE Silane 1 | 0.0146 |
| Synthesis Example 3 | Organic Vehicle 3 | 12.1700 | Fluorinated Vehicle 1 | 0.0584 | PFPE Silane 1 | 0.0146 |
| Synthesis Example 4 | Organic Vehicle 4 | 10.0900 | Fluorinated Vehicle 1 | 0.0944 | PFPE Silane 1 | 0.0236 |
| Synthesis Example 5 | Organic Vehicle 5 | 10.0900 | Fluorinated Vehicle 1 | 0.0800 | PFPE Silane 1 | 0.0200 |

TABLE 1-continued

|  | Continuous Phase | | Discontinuous Phase | | | |
|---|---|---|---|---|---|---|
| | | | Fluorinated | | Poly-fluoro-polyether (PFPE) | |
| Synthesis Example | Organic Vehicle | Amount (g) | Fluorinated vehicle | Amount (g) | (PFPE) Silane | Amount (g) |
| Synthesis Example 6 | Organic Vehicle 6 | 9.8980 | Fluorinated Vehicle 1 | 0.0808 | PFPE Silane 1 | 0.0202 |
| Synthesis Example 7 | Organic Vehicle 7 | 10.0400 | Fluorinated Vehicle 1 | 0.1000 | PFPE Silane 1 | 0.0250 |
| Synthesis Example 8 | Organic Vehicle 8 | 10.5140 | Fluorinated Vehicle 1 | 0.0664 | PFPE Silane 1 | 0.0166 |
| Synthesis Example 9 | Organic Vehicle 9 | 10.2800 | Fluorinated Vehicle 1 | 0.0720 | PFPE Silane 1 | 0.0180 |
| Synthesis Example 10 | Organic Vehicle 10 | 9.8800 | Fluorinated Vehicle 1 | 0.0968 | PFPE Silane 1 | 0.0242 |
| Synthesis Example 11 | Organic Vehicle 11 | 10.6600 | Fluorinated Vehicle 1 | 0.1176 | PFPE Silane 1 | 0.0294 |
| Synthesis Example 12 | Organic Vehicle 12 | 9.4500 | Fluorinated Vehicle 1 | 0.1040 | PFPE Silane 1 | 0.0260 |
| Synthesis Example 13 | Organic Vehicle 13 | 10.0000 | Fluorinated Vehicle 1 | 0.1320 | PFPE Silane 1 | 0.0330 |
| Synthesis Example 14 | Organic Vehicle 14 | 10.2200 | Fluorinated Vehicle 1 | 0.0800 | PFPE Silane 1 | 0.0200 |
| Synthesis Example 15 | Organic Vehicle 15 | 10.5000 | Fluorinated Vehicle 1 | 0.0880 | PFPE Silane 1 | 0.0220 |
| Synthesis Example 16 | Organic Vehicle 16 | 10.6340 | Fluorinated Vehicle 1 | 0.1536 | PFPE Silane 1 | 0.0384 |
| Synthesis Example 17 | Organic Vehicle 17 | 9.7200 | Fluorinated Vehicle 1 | 0.0688 | PFPE Silane 1 | 0.0172 |
| Synthesis Example 18 | Organic Vehicle 18 | 10.0200 | Fluorinated Vehicle 1 | 0.0824 | PFPE Silane 1 | 0.0206 |
| Synthesis Example 19 | Organic Vehicle 19 | 10.6000 | Fluorinated Vehicle 1 | 0.0667 | PFPE Silane 1 | 0.0167 |
| Synthesis Example 20 | Organic Vehicle 20 | 9.8000 | Fluorinated Vehicle 1 | 0.0800 | PFPE Silane 1 | 0.0200 |
| Synthesis Example 21 | Organic Vehicle 21 | 10.3000 | Fluorinated Vehicle 1 | 0.0840 | PFPE Silane 1 | 0.0210 |
| Synthesis Example 22 | Organic Vehicle 22 | 10.1700 | Fluorinated Vehicle 1 | 0.0832 | PFPE Silane 1 | 0.0208 |
| Synthesis Example 23 | Organic Vehicle 23 | 8.0000 | Fluorinated Vehicle 1 | 0.0680 | PFPE Silane 1 | 0.0170 |
| Synthesis Example 24 | Organic Vehicle 24 | 10.2650 | Fluorinated Vehicle 1 | 0.1024 | PFPE Silane 1 | 0.0256 |
| Synthesis Example 25 | Organic Vehicle 25 | 12.3400 | Fluorinated Vehicle 1 | 0.0896 | PFPE Silane 1 | 0.0224 |
| Synthesis Example 26 | Organic Vehicle 26 | 10.1450 | Fluorinated Vehicle 1 | 0.1272 | PFPE Silane 1 | 0.0318 |
| Synthesis Example 27 | Organic Vehicle 27 | 9.8650 | Fluorinated Vehicle 1 | 0.0784 | PFPE Silane 1 | 0.0196 |
| Synthesis Example 28 | Organic Vehicle 28 | 9.2200 | Fluorinated Vehicle 1 | 0.0736 | PFPE Silane 1 | 0.0184 |
| Synthesis Example 29 | Organic Vehicle 29 | 9.7700 | Fluorinated Vehicle 1 | 0.0870 | PFPE Silane 1 | 0.0218 |
| Synthesis Example 30 | Organic Vehicle 30 | 9.4000 | Fluorinated Vehicle 1 | 0.0770 | PFPE Silane 1 | 0.0192 |
| Synthesis Example 31 | Organic Vehicle 31 | 8.0700 | Fluorinated Vehicle 1 | 0.0640 | PFPE Silane 1 | 0.0160 |
| Synthesis Example 32 | Organic Vehicle 32 | 9.8000 | Fluorinated Vehicle 1 | 0.0798 | PFPE Silane 1 | 0.0200 |
| Synthesis Example 33 | Organic Vehicle 33 | 10.9500 | Fluorinated Vehicle 1 | 0.0904 | PFPE Silane 1 | 0.0226 |
| Synthesis Example 34 | Organic Vehicle 34 | 11.4100 | Fluorinated Vehicle 1 | 0.0897 | PFPE Silane 1 | 0.0224 |
| Synthesis Example 35 | Organic Vehicle 35 | 10.5900 | Fluorinated Vehicle 1 | 0.0813 | PFPE Silane 1 | 0.0203 |
| Synthesis Example 36 | Organic Vehicle 36 | 9.5770 | Fluorinated Vehicle 1 | 0.0782 | PFPE Silane 1 | 0.0195 |
| Synthesis Example 37 | Organic Vehicle 37 | 9.2000 | Fluorinated Vehicle 1 | 0.0751 | PFPE Silane 1 | 0.0188 |
| Synthesis Example 38 | Organic Vehicle 38 | 11.3600 | Fluorinated Vehicle 1 | 0.0881 | PFPE Silane 1 | 0.0220 |
| Synthesis Example 39 | Organic Vehicle 39 | 9.5130 | Fluorinated Vehicle 1 | 0.0766 | PFPE Silane 1 | 0.0191 |
| Synthesis Example 40 | Organic Vehicle 40 | 9.9150 | Fluorinated Vehicle 1 | 0.0816 | PFPE Silane 1 | 0.0204 |

Organic Vehicle 1 is acetone.
Organic Vehicle 2 is acetonitrile.
Organic Vehicle 3 is acetylacetone.
Organic Vehicle 4 is digylme.
Organic Vehicle 5 is dimethyl sulfoxide.
Organic Vehicle 6 is dimethylformamide.
Organic Vehicle 7 is limonene.
Organic Vehicle 8 is methyl 10-undecenoate.
Organic Vehicle 9 is methylene chloride.
Organic Vehicle 10 is m-xylene.
Organic Vehicle 11 is n-butyl acetate.
Organic Vehicle 12 is nitromethane.
Organic Vehicle 13 is propylene carbonate.
Organic Vehicle 14 is t-butyl acetoeacetate.
Organic Vehicle 15 is tetraethylene glycol dimethyl ether.
Organic Vehicle 16 is triethylene glycol dimethyl ether.
Organic Vehicle 17 is methyl isobutyl ketone.
Organic Vehicle 18 is isopropanol.
Organic Vehicle 19 is ethanol.
Organic Vehicle 20 is 2-pentanone.
Organic Vehicle 21 is 1-methoxy-2-propanol.
Organic Vehicle 22 is propylene glycol monomethyl ether acetate.
Organic Vehicle 23 is hexane.
Organic Vehicle 24 is isoamyl acetate.
Organic Vehicle 25 is diethyl fumarate.
Organic Vehicle 26 is t-butanol.

Organic Vehicle 27 is 1-butanol.
Organic Vehicle 28 is 2-butanone.
Organic Vehicle 29 is heptane.
Organic Vehicle 30 is decane.
Organic Vehicle 31 is t-butyl methyl ether.
Organic Vehicle 32 is toluene.
Organic Vehicle 33 is n-butanol.
Organic Vehicle 34 is tetrahydrofuran.
Organic Vehicle 35 is a blend of 10 wt. % methyl nonafluorobutyl ether, 20 wt. % ethyl nonafluorobutyl ether, and 70 wt. % trans-1,2-dichloroethylene, each based on the total weight of Organic vehicle 35.
Organic Vehicle 36 is hexamethyldisiloxane.
Organic Vehicle 37 is cyclohexane.
Organic Vehicle 38 is xylene.
Organic Vehicle 39 is t-butyl acetate.
Organic Vehicle 40 is ethylene glycol.
Fluorinated Vehicle 1 is ethoxy-nonafluorobutane ($C_4F_9OC_2H_5$).
Polyfluoropolyether Silane 1 has the general formula: $F((CF_2)_3O)_{c'}CF_2CF_2CH_2O(CH_2)_3Si(OMe)_3$, where c' is from 17-25.
Fluorinated Composition 1 comprises a mixture of Fluorinated vehicle 1 and Polyfluoropolyether Silane 1.

After preparing Synthesis Examples 1-40, each of the resulting non-aqueous emulsions is vortexed and analyzed to determine whether each of the non-aqueous emulsions exhibits the Tyndall effect.

More specifically, after vortexing each of the non-aqueous emulsions, the non-aqueous emulsions are visually inspected and rated based on their respective exhibition of the Tyndall effect (or lack thereof). Each of the non-aqueous emulsions is visually inspected at various increments of time after vortexing to determine the period of time during which each of the non-aqueous emulsions exhibited the Tyndall effect. Each of the non-aqueous emulsions of Synthesis Examples 1-40 is rated based on the exhibition of the Tyndall effect, both after vortexing and at the various increments of time. A ranking of "0" indicates that the particular non-aqueous emulsion was a clear solution that did not exhibit the Tyndall effect. A ranking of "1" indicates that the particular non-aqueous emulsion exhibited a very faint light beam. A ranking of "2" indicates that the particular non-aqueous emulsion exhibited a slightly faint light beam. A ranking of "3" indicates that the particular non-aqueous emulsion exhibited a clear central light beam. A ranking of "4" indicates that the particular non-aqueous emulsion exhibited a clear central light beam with at least some "cone" of light visible. Finally, a ranking of "5" indicates that the particular non-aqueous emulsion exhibited a well defined light beam and cone. An indication of "Y" generally means that the particular non-aqueous emulsion did exhibit the Tyndall effect, though "Y" may indicate any ranking of 1-5, i.e., any rating other than "0." A "n/a" rating means that the particular non-aqueous emulsion was not evaluated at the particular time increment.

Table 2 below sets forth the relevant ratings information for each of Synthesis Examples 1-40. N/A in Table 2 designates that a particular value was not obtainable at the designated time.

TABLE 2

| Synthesis Example | Initial | 5-15 min | 1-1.5 hours | 3 days | 2 weeks |
| --- | --- | --- | --- | --- | --- |
| Synthesis Example 1 | 5 | 5 | 5 | 5 | 4 |
| Synthesis Example 2 | 0 | 0 | 0 | 0 | 0 |
| Synthesis Example 3 | 1 | 1 | 1 | 1 | 0 |
| Synthesis Example 4 | 1 | 1 | 1 | 0 | 0 |
| Synthesis Example 5 | 4 | 3 | 3 | 0 | 0 |
| Synthesis Example 6 | 1 | 1 | 1 | 0 | 0 |
| Synthesis Example 7 | 1 | 0 | 0 | 0 | 0 |
| Synthesis Example 8 | 1 | 1 | 1 | 0 | 0 |
| Synthesis Example 9 | 3 | 2 | 1 | 0 | 0 |
| Synthesis Example 10 | 3 | 3 | 2 | 1 | 0 |
| Synthesis Example 11 | 4 | 4 | 4 | 3 | 2 |
| Synthesis Example 12 | 0 | 0 | 0 | 0 | 0 |
| Synthesis Example 13 | 3 | 3 | 2 | 0 | 0 |
| Synthesis Example 14 | 2 | 2 | 2 | 1 | 0 |
| Synthesis Example 15 | 3 | 3 | 2 | 1 | 1 |
| Synthesis Example 16 | 4 | 4 | 3 | 3 | 3 |
| Synthesis Example 17 | 5 | 5 | 5 | 5 | 4 |
| Synthesis Example 18 | 1 | 0 | 0 | 0 | 0 |
| Synthesis Example 19 | 0 | 0 | 0 | 0 | 0 |
| Synthesis Example 20 | 5 | 5 | 5 | 5 | 4 |
| Synthesis Example 21 | 2 | 1 | 0 | 0 | 0 |
| Synthesis Example 22 | 2 | 2 | 1 | 0 | 0 |
| Synthesis Example 23 | 0 | 0 | 0 | 0 | 0 |
| Synthesis Example 24 | 4 | 4 | 3 | 2 | 2 |
| Synthesis Example 25 | 3 | 3 | 1 | 1 | 1 |
| Synthesis Example 26 | 5 | 3 | n/a | 1 | 0 |
| Synthesis Example 27 | 1 | 0 | 0 | 0 | 0 |
| Synthesis Example 28 | 5 | 5 | 5 | 5 | 4 |
| Synthesis Example 29 | 0 | n/a | 0 | n/a | 0 |
| Synthesis Example 30 | 0 | n/a | 0 | n/a | 0 |
| Synthesis Example 31 | Y | n/a | Y | n/a | 0 |
| Synthesis Example 32 | Y | n/a | Y | n/a | 0 |
| Synthesis Example 33 | 0 | n/a | o | n/a | 0 |
| Synthesis Example 34 | Y | n/a | Y | n/a | 5 |
| Synthesis Example 35 | Y | n/a | Y | n/a | 1 |
| Synthesis Example 36 | 0 | n/a | 0 | n/a | 0 |
| Synthesis Example 37 | 0 | n/a | 0 | n/a | 0 |
| Synthesis Example 38 | Y | n/a | Y | n/a | 0 |
| Synthesis Example 39 | Y | n/a | Y | n/a | 5 |
| Synthesis Example 40 | 5 | n/a | Y | n/a | 0 |

As clearly illustrated in Table 2 above, certain organic vehicles prepare non-aqueous emulsions exhibiting the Tyndall effect while other organic vehicles do not. Moreover, there are differences in terms of the shelf life of the non-aqueous emulsions during which the non-aqueous emulsions exhibit the Tyndall effect.

For example, acetone, methyl isobutyl ketone, 2-pentanone, 2-butanone, tetrahydrofuran, and t-butyl acetate each prepared non-aqueous emulsions having excellent physical properties even after 2 weeks. Conversely, acetonitrile, nitromethane, ethanol, hexane, heptane, decane, n-butanol, and cyclohexane did not ever form non-aqueous emulsions that exhibited the Tyndall effect, even for an ephemeral period of time. Other organic vehicles prepared non-aqueous emulsions that initially exhibited the Tyndall effect, though the Tyndall effect decreased over time.

Various non-aqueous emulsions are prepared in accordance with the subject disclosure and utilized to form layers. Specifically, in Practical Examples 1-23 below, non-aqueous emulsions are prepared in accordance with the procedure described above relative to Synthesis Examples 1-40, but for Practical Example 9, which does not include a fluorinated vehicle in the discontinuous stage. In Practical Example 9, the polyfluoropolyether silane is added directly to the organic vehicle dropwise. Table 3 below illustrates the compositions utilized to prepare the non-aqueous emulsions of Practical Examples 1-23.

TABLE 3

| Practical Example | Continuous Phase Organic Vehicle | Amount (g) | Discontinuous Phase Fluorinated Vehicle | Amount (g) | Polyfluoropolyether (PFPE) Silane | Amount (g) |
|---|---|---|---|---|---|---|
| Practical Example 1 | Organic Vehicle 39 | 15.9990 | Fluorinated Vehicle 1 | 3.9521 | PFPE Silane 1 | 0.0399 |
| Practical Example 2 | Organic Vehicle 39 | 19.7300 | Fluorinated Vehicle 1 | 0.2295 | PFPE Silane 1 | 0.0405 |
| Practical Example 3 | Organic Vehicle 39 | 19.8000 | Fluorinated Vehicle 1 | 0.1632 | PFPE Silane 1 | 0.0408 |
| Practical Example 4 | Organic Vehicle 39 | 19.9200 | Fluorinated Vehicle 1 | 0.0415 | PFPE Silane 1 | 0.0415 |
| Practical Example 5 | Organic Vehicle 1 | 16.0000 | Fluorinated Vehicle 1 | 3.9600 | PFPE Silane 1 | 0.0400 |
| Practical Example 6 | Organic Vehicle 1 | 19.7300 | Fluorinated Vehicle 1 | 0.2304 | PFPE Silane 1 | 0.0407 |
| Practical Example 7 | Organic Vehicle 1 | 19.8160 | Fluorinated Vehicle 1 | 0.1612 | PFPE Silane 1 | 0.0398 |
| Practical Example 8 | Organic Vehicle 1 | 19.9200 | Fluorinated Vehicle 1 | 0.0400 | PFPE Silane 1 | 0.0400 |
| Practical Example 9 | Organic Vehicle 1 | 19.9600 | Fluorinated Vehicle 1 | 0.0000 | PFPE Silane 1 | 0.0380 |
| Practical Example 10 | Organic Vehicle 1 | 19.8000 | Fluorinated Vehicle 2 | 0.1677 | PFPE Silane 1 | 0.0383 |
| Practical Example 11 | Organic Vehicle 1 | 19.8000 | Fluorinated Vehicle 3 | 0.1628 | PFPE Silane 1 | 0.0402 |
| Practical Example 12 | Organic Vehicle 1 | 19.8000 | Fluorinated Vehicle 4 | 0.1608 | PFPE Silane 1 | 0.0402 |
| Practical Example 13 | Organic Vehicle 1 | 19.8000 | Fluorinated Vehicle 5 | 0.1602 | PFPE Silane 1 | 0.0398 |
| Practical Example 14 | Organic Vehicle 1 | 19.8000 | Fluorinated Vehicle 6 | 0.1634 | PFPE Silane 1 | 0.0406 |
| Practical Example 15 | Organic Vehicle 39 | 19.8000 | Fluorinated Vehicle 1 | 0.1608 | PFPE Silane 2 | 0.0402 |
| Practical Example 16 | Organic Vehicle 39 | 19.8000 | Fluorinated Vehicle 1 | 0.1630 | PFPE Silane 3 | 0.0400 |
| Practical Example 17 | Organic Vehicle 39 | 19.8000 | Fluorinated Vehicle 1 | 0.1670 | PFPE Silane 4 | 0.0410 |
| Practical Example 18 | Organic Vehicle 39 | 19.8000 | Fluorinated Vehicle 1 | 0.1658 | PFPE Silane 5 | 0.0412 |
| Practical Example 19 | Organic Vehicle 31 | 9.9000 | Fluorinated Vehicle 1 | 0.0800 | PFPE Silane 1 | 0.0200 |
| Practical Example 20 | Organic Vehicle 32 | 9.9000 | Fluorinated Vehicle 1 | 0.0832 | PFPE Silane 1 | 0.0208 |
| Practical Example 21 | Organic Vehicle 33 | 9.9000 | Fluorinated Vehicle 1 | 0.0816 | PFPE Silane 1 | 0.0204 |
| Practical Example 22 | Organic Vehicle 34 | 9.9000 | Fluorinated Vehicle 1 | 0.0824 | PFPE Silane 1 | 0.0206 |
| Practical Example 23 | Organic Vehicle 40 | 9.9200 | Fluorinated Vehicle 1 | 0.0824 | PFPE Silane 1 | 0.0206 |

Fluorinated vehicle 2 is perfluorohexane ($C_6F_{14}$).

Fluorinated vehicle 3 is 1,3-bis(trifluoromethyl)benzene.

Fluorinated vehicle 4 is 1,1,2,3,3,3-hexafluoro-1-propene.

Fluorinated vehicle 5 is a blend of methyl nonafluorobutyl ether, ethyl nonafluorobutyl ether, and trans-1,2-dichloroethylene.

Fluorinated vehicle 6 is decafluoropentane ($C_5F_{12}$).

Polyfluoropolyether Silane 2 has the general formula $F-(CF(CF_3)-CF_2-O)_a-CF(CF_3)-CH_2-O-CH_2-CH_2-CH_2-Si-(OCH_3)_3$, where a is an integer from 14 to 20.

Polyfluoropolyether Silane 3 has the general formula $(CH_3O)_3Si-CH_2-CH_2-CH_2-O-CH_2-CF_2-(OCF_2CF_2)_e-(OCF_2)_g-CH_2-O-CH_2-CH_2-CH_2-SHOCH_3)_3$, where e and g are each independently integers $\geq 1$.

Polyfluoropolyether Silane 4 has the general formula $F-(CF(CF_3)CF_2O)_a-CF(CF_3)-CH_2-O-CH_2-CH_2-CH_2-Si(CH_3)_2-O-Si(CH_3)_2-CH_2-CH_2-Si(OCH_3)_3$, where a is an integer from 14 to 20.

Polyfluoropolyether Silane 5 has the general formula has the general formula: $F((CF_2)_3O)_{c'}CF_2CF_2CH_2O(CH_2)_3SiH_3$, where c' is from 17-25.

The respective non-aqueous emulsions of Practical Examples 1-23 are each applied to a surface of a substrate via spray coating. In particular, these compositions are applied to a glass substrate via a PVA-1000 dispensing machine (from Precision, Valve, & Automation of Cohoes, N.Y.) having an atomization pressure of 8 psi, a liquid pressure of 3 psi, a stroke of 0.004", a nozzle height of 7 cm, a spacing of 10 mm, and a speed of about 200 mm/sec. Once the respective non-aqueous emulsions were applied to the substrates, the non-aqueous emulsions were cured at 125° C. for 1 hour to form layers on the substrates.

Physical properties of the layers formed from the non-aqueous emulsions are measured. In particular, physical properties of the respective layers are measured before and after subjecting the layers to an abrasion resistance test, as described below.

More specifically, sliding coefficient of friction (COF) is measured for each of the layers. The sliding coefficient of friction is measured via a TA-XT2 Texture Analyzer, commercially available from Texture Technologies of Scarsdale, N.Y. The sliding coefficient of friction is measured by placing a sled having a load of about 156 grams onto each of the layers with a piece of standard paper disposed between each of the layers and the sled. The sled has an area of about 25×25 millimeters. A force is applied in a direction perpendicular to gravity to move the sled along each of the layers at a speed of about 2.5 millimeters/sec for a distance of about 42 millimeters to measure the sliding coefficient of friction. The abrasion resistance test utilizes a reciprocating abraser—Model 5900, which is commercially available from Taber Industries of North Tonawanda, N.Y. The abrading material utilized was a CS-10 Wearaser® from Taber Industries. The abrading material has dimensions of 6.5 mm×12.2 mm. The reciprocating abraser is operated for 25 cycles at a speed of 25 cycles per minute with a stroke length of 1 inch and a load of 7.5 N.

The water contact angle (WCA) of each of the layers is measured via a VCA Optima XE goniometer, which is commercially available from AST Products, Inc., Billerica, Mass. The water contact angle measured is a static contact angle based on a 2 µL droplet on each of the layers. The water contact angle is measured before (designated as "initial" in Table 4 below) and after (designated as "final" in Table 4 below) the abrasion resistance test described above. Generally, the greater the WCA after abrasion, the greater the durability of the layer formed from the particular non-aqueous emulsion. N/A in Table 4 designates that a particular value was not measured.

TABLE 4

| Practical Example | WCA (initial) | WCA (final) | COF (μ) |
|---|---|---|---|
| Practical Example 1 | 115.5 | 97.8 | 0.1 |
| Practical Example 2 | 114.9 | 95.0 | 0.1 |
| Practical Example 3 | 114.5 | 107.2 | 0.1 |
| Practical Example 4 | 114.5 | 110.7 | 0.1 |
| Practical Example 5 | 115.7 | 110.1 | n/a |
| Practical Example 6 | 115.9 | 109.7 | n/a |
| Practical Example 7 | 115.9 | 111.0 | n/a |
| Practical Example 8 | 111.3 | 89.6 | n/a |
| Practical Example 9 | 88.1 | 72.5 | n/a |
| Practical Example 10 | 116.5 | 100.0 | n/a |
| Practical Example 11 | 115.0 | 107.1 | n/a |
| Practical Example 12 | 116.2 | 108.9 | n/a |
| Practical Example 13 | 116.1 | 109.9 | n/a |
| Practical Example 14 | 116.6 | 110.7 | n/a |
| Practical Example 15 | 117.5 | 105.2 | 0.2 |
| Practical Example 16 | 107.5 | 109.5 | 0.1 |
| Practical Example 17 | 118.3 | 98.9 | 0.2 |
| Practical Example 18 | 118.1 | 110.0 | 0.1 |
| Practical Example 19 | 117.8 | 112.8 | n/a |
| Practical Example 20 | 32.0 | 58.6 | n/a |
| Practical Example 21 | 18.5 | 55.2 | n/a |
| Practical Example 22 | 110.0 | 109.1 | n/a |
| Practical Example 23 | 95.1 | 64.6 | n/a |

Notably, the Example above are generally based on a desired concentration of the polyfluoropolyether silane in the non-aqueous emulsions. The desired concentration is a function of desired performance of the layer formed from the non-aqueous emulsion as well as relative cost. For example, it is desirable to maximize the physical properties of the layer while minimizing cost. Minimizing cost is generally associated with minimizing the concentration of the polyfluoropolyether silane in the non-aqueous emulsion. However, if desired, higher concentrations of the polyfluoropolyether silane than those illustrated in the Examples above may be utilized while still obtaining advantageous properties.

For example, a non-aqueous emulsion is prepared in accordance with the subject disclosure and utilized to form a layer. Specifically, in Practical Example 24 below, a non-aqueous emulsion is prepared in accordance with the procedure described above relative to Synthesis Examples 1-40. Table 5 below illustrates the composition utilized to prepare the non-aqueous emulsion of Practical Example 24.

TABLE 5

| | Continuous Phase | | Discontinuous Phase | | | |
|---|---|---|---|---|---|---|
| Practical Example | Organic Vehicle | Amount (g) | Fluorinated Vehicle | Amount (g) | Polyfluoropolyether (PFPE) Silane | Amount (g) |
| Practical Example 24 | Organic Vehicle 39 | 4.6990 | Fluorinated Vehicle 1 | 3.7592 | PFPE Silane 1 | 0.9398 |

The concentration of the polyfluoropolyether silane in the non-aqueous emulsion of Practical Example 24 is roughly 500% greater than that of many of Practical Examples 1-23.

Physical properties of the layer formed from the non-aqueous emulsion of Practical Example 24 are measured. In particular, physical properties are measured in accordance with the description above for Practical Examples 1-23. Table 6 below illustrates the physical properties of the layer formed from the non-aqueous emulsion of Practical Example 24.

TABLE 6

| Practical Example | WCA (initial) | WCA (final) | COF (μ) |
|---|---|---|---|
| Practical Example 24 | 113.1 | 105.77 | n/a |

As clearly illustrated above in Table 6, even utilizing higher concentrations of the polyfluoropolyether silane in the non-aqueous emulsion provides excellent physical properties with respect to the layer formed therefrom.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A non-aqueous emulsion, comprising:
   a continuous organic phase comprising an organic vehicle; and
   a discontinuous phase comprising a polyfluoropolyether silane;
   wherein said non-aqueous emulsion exhibits the Tyndall effect for a period of time; and
   wherein said discontinuous phase further comprises a fluorinated vehicle or
   wherein a fluorinated vehicle is excluded from said discontinuous phase and the discontinuous phase is present in the non-aqueous emulsion in an amount of from greater than 0 to 1.0 percent by weight based on the total weight of the non-aqueous emulsion.

2. The non-aqueous emulsion of claim 1 wherein said discontinuous phase further comprises a fluorinated vehicle.

3. The non-aqueous emulsion of claim 1 wherein said organic vehicle is selected from the group consisting of t-butyl acetate, acetone, tetrahydrofuran, n-butyl acetate, dimethyl sulfoxide, methylene chloride, diglyme, tetraethylene glycol dimethyl ether, triethylene glycol dimethyl ether, methyl 10-undecenoate, dimethylformamide, t-butyl acetoacetate, methyl isobutyl ketone, 2-pentanone, 2-butanone, acetylacetone, limonene, xylene, propylene carbonate, isopropanol, 1-methoxy-2-propanol, propylene glycol monomethyl ether acetate, isoamyl acetate, diethyl fumarate, t-butanol, 1-butanol, t-butyl methyl ether, toluene, ethylene glycol, and combinations thereof.

4. The non-aqueous emulsion of claim 1 wherein said discontinuous phase further comprises a fluorinated vehicle and wherein said organic vehicle is selected from the group consisting of t-butyl acetate, acetone, tetrahydrofuran, n-butyl acetate, dimethyl sulfoxide, methylene chloride, diglyme, tetraethylene glycol dimethyl ether, triethylene glycol dimethyl ether, methyl 10-undecenoate, dimethylformamide, t-butyl acetoacetate, methyl isobutyl ketone, 2-pentanone, 2-butanone, acetylacetone, limonene, xylene, propylene carbonate, isopropanol, 1-methoxy-2-propanol, propylene glycol monomethyl ether acetate, isoamyl acetate, diethyl fumarate, t-butanol, 1-butanol, t-butyl methyl ether, toluene, ethylene glycol, and combinations thereof.

5. The non-aqueous emulsion of claim 1 wherein said polyfluoropolyether silane has the general formula (A):
$Y-Z_a-[(OC_3F_6)_b-(OCF(CF_3)CF_2)_c-(OCF_2CF$ $(CF_3))_d$—$(OC_2F_4)_e$—$(CF(CF_3))_f$—$(OCF_2)_g$]—$(CH_2)_h$—X'—$(C_nH_{2n})$—$((SiR^1_2$—O)$_m$—SiR$^1_2)_i$—$(C_jH_{2j})$—Si—$(X")_{3-z}(R^2)_z$;

wherein Z is independently selected from —(CF$_2$)—, —(CF(CF$_3$)CF$_2$O)—, —(CF$_2$CF(CF$_3$)O)—, —(CF(CF$_3$)O)—, —(CF(CF$_3$)CF$_2$)—, —(CF$_2$CF(CF$_3$))—, and —(CF(CF$_3$))—; a is an integer from 1 to 200; b, c, d, e, f, and g are integers each independently selected from 0 to 200; h, n and j are integers each independently selected from 0 to 20; i and m are integers each independently selected from 0 to 5; X' is a bivalent organic group or O; R$^1$ is an independently selected C$_1$-C$_{22}$ hydrocarbyl group; z is an integer independently selected from 0 to 2; X" is an independently selected hydrolysable group; R$^2$ is an independently selected C$_1$-C$_{22}$ hydrocarbyl group which is free of aliphatic unsaturation; and Y is selected from H, F, and (R$^2$)$_z$(X")$_{3-z}$Si—(C$_jH_{2j}$)—((SiR$^1_2$—O)$_m$—SiR$^1_2)_i$—(C$_nH_{2n}$)—X'—(CH$_2$)$_h$—; wherein X", X', z, R$^1$, R$^2$, j, m, i, n and h are as defined above;

provided that when subscript i is 0, subscript j is also 0; when subscript i is an integer greater than 0, subscript j is also an integer greater than 0; and when subscript i is an integer greater than 0, m is also an integer greater than 0.

6. The non-aqueous emulsion of claim 5 wherein said hydrolysable group represented by X" in general formula (A) of said polyfluoropolyether silane is independently selected from H, a halide group, —OR$^3$, —NHR$^3$, —NR$^3$R$^4$, —OOC—R$^3$, O—N=CR$^3$R$^4$, O—C(=CR$^3$R$^4$)R$^5$, and —NR$^3$COR$^4$, wherein R$^3$, R$^4$ and R$^5$ are each independently selected from H and a C$_1$-C$_{22}$ hydrocarbyl group, and wherein R$^3$ and R$^4$ optionally can be taken together with the nitrogen atom to which they are both bonded to form a cyclic amino group.

7. The non-aqueous emulsion of claim 1 further comprising a surfactant.

8. A non-aqueous emulsion, comprising:
    a continuous organic phase comprising an organic vehicle; and
    a discontinuous phase comprising a polyfluoropolyether silane;
    wherein said organic vehicle is selected from the group consisting of t-butyl acetate, acetone, tetrahydrofuran, n-butyl acetate, dimethyl sulfoxide, methylene chloride, diglyme, tetraethylene glycol dimethyl ether, triethylene glycol dimethyl ether, methyl 10-undecenoate, dimethylformamide, t-butyl acetoacetate, methyl isobutyl ketone, 2-pentanone, 2-butanone, acetylacetone, limonene, xylene, propylene carbonate, isopropanol, 1-methoxy-2-propanol, propylene glycol monomethyl ether acetate, isoamyl acetate, diethyl fumarate, t-butanol, 1-butanol, t-butyl methyl ether, toluene, ethylene glycol, and combinations thereof; and
    wherein said discontinuous phase further comprises a fluorinated vehicle or
    wherein a fluorinated vehicle is excluded from said discontinuous phase and the discontinuous phase is present in the non-aqueous emulsion in an amount of from greater than 0 to 1.0 percent by weight based on the total weight of the non-aqueous emulsion.

9. The non-aqueous emulsion of claim 8 wherein said discontinuous phase further comprises a fluorinated vehicle.

10. The non-aqueous emulsion of claim 8 wherein said polyfluoropolyether silane has the general formula (A):
Y—Z$_a$—[(OC$_3$F$_6$)$_b$—(OCF(CF$_3$)CF$_2$)$_c$—(OCF$_2$CF$(CF_3$))$_d$—(OC$_2$F$_4$)$_e$—(CF(CF$_3$))$_f$—(OCF$_2$)$_g$]—(CH$_2$)$_h$—X'—(C$_nH_{2n}$)—((SiR$^1_2$—O)$_m$—SiR$^1_2)_i$—(C$_jH_{2j}$)—Si—(X")$_{3-z}$(R$^2$)$_z$;

wherein Z is independently selected from —(CF$_2$)—, —(CF(CF$_3$)CF$_2$O)—, —(CF$_2$CF(CF$_3$)O)—, —(CF(CF$_3$)O)—, —(CF(CF$_3$)CF$_2$)—, —(CF$_2$CF(CF$_3$))—, and —(CF(CF$_3$))—; a is an integer from 1 to 200; b, c, d, e, f, and g are integers each independently selected from 0 to 200; h, n and j are integers each independently selected from 0 to 20; i and m are integers each independently selected from 0 to 5; X' is a bivalent organic group or O; R$^1$ is an independently selected C$_1$-C$_{22}$ hydrocarbyl group; z is an integer independently selected from 0 to 2; X" is an independently selected hydrolysable group; R$^2$ is an independently selected C$_1$-C$_{22}$ hydrocarbyl group which is free of aliphatic unsaturation; and Y is selected from H, F, and (R$^2$)$_z$(X")$_{3-z}$Si—(C$_jH_{2j}$)—((SiR$^1_2$—O)$_m$—SiR$^1_2)_i$—(C$_nH_{2n}$)—X'—(CH$_2$)$_h$—; wherein X", X', z, R$^1$, R$^2$, j, m, i, n and h are as defined above;

provided that when subscript i is 0, subscript j is also 0; when subscript i is an integer greater than 0, subscript j is also an integer greater than 0; and when subscript i is an integer greater than 0, m is also an integer greater than 0.

11. The non-aqueous emulsion of claim 10 wherein said hydrolysable group represented by X" in general formula (A) of said polyfluoropolyether silane is independently selected from H, a halide group, —OR$^3$, —NHR$^3$, —NR$^3$R$^4$, —OOC—R$^3$, O—N=CR$^3$R$^4$, O—C(=CR$^3$R$^4$)R$^5$, and —NR$^3$COR$^4$, wherein R$^3$, R$^4$ and R$^5$ are each independently selected from H and a C$_1$-C$_{22}$ hydrocarbyl group, and wherein R$^3$ and R$^4$ optionally can be taken together with the nitrogen atom to which they are both bonded to form a cyclic amino group.

12. The non-aqueous emulsion of claim 8 further comprising a surfactant.

13. A method of preparing a surface-treated article, said method comprising:
    applying the non-aqueous emulsion of claim 1 on a surface of an article to form a wet layer thereof on the surface of the article; and
    removing the organic vehicle from the wet layer to form a layer on the surface of the article and give the surface-treated article.

14. The method of claim 13 wherein the step of applying the non-aqueous emulsion uses an application method selected from dip coating, spin coating, flow coating, spray coating, roll coating, gravure coating, slot coating, inkjet printing, and combinations thereof.

15. A method of preparing a surface-treated article, said method comprising the steps of:
    combining the non-aqueous emulsion of claim 1 and a pellet to form an impregnated pellet;
    removing the organic vehicle from the impregnated pellet to form a neat pellet; and
    forming a layer on a surface of an article with the neat pellet via a deposition apparatus.

16. The non-aqueous emulsion of claim 1, wherein a fluorinated vehicle is excluded from said discontinuous phase and the discontinuous phase is present in the non-aqueous emulsion in an amount of from greater than 0 to 1.0 percent by weight based on the total weight of the non-aqueous emulsion.

17. The non-aqueous emulsion of claim 8, wherein a fluorinated vehicle is excluded from said discontinuous phase and the discontinuous phase is present in the non-aqueous emulsion in an amount of from greater than 0 to 1.0 percent by weight based on the total weight of the non-aqueous emulsion.

\* \* \* \* \*